US010893083B2

(12) United States Patent
Liu et al.

(10) Patent No.: US 10,893,083 B2
(45) Date of Patent: Jan. 12, 2021

(54) NEIGHBOR AWARENESS NETWORKING DATAPATH—SCHEDULING, SCHEDULER RANK, AND PRE-DATAPATH OPERATION TRIGGERING

(71) Applicant: Apple Inc., Cupertino, CA (US)

(72) Inventors: Yong Liu, Campbell, CA (US); Christiaan A. Hartman, San Jose, CA (US); Daniel R. Borges, San Francisco, CA (US); Peter N. Heerboth, San Jose, CA (US); Lawrie Kurian, San Jose, CA (US); Su Khiong Yong, Palo Alto, CA (US); Anand Rajagopalan, Saratoga, CA (US); Saravanan Balasubramaniyan, Los Gatos, CA (US); Tashbeeb Haque, San Francisco, CA (US); Andreas Wolf, San Mateo, CA (US); Guoqing Li, Cupertino, CA (US); Lilach Zukerman, Pardesia (IL); Oren Shani, Kfar Saba (IL)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 15/164,067

(22) Filed: May 25, 2016

(65) Prior Publication Data

US 2016/0353470 A1 Dec. 1, 2016

Related U.S. Application Data

(60) Provisional application No. 62/188,891, filed on Jul. 6, 2015, provisional application No. 62/182,920, filed
(Continued)

(51) Int. Cl.
*H04L 29/06* (2006.01)
*H04W 8/00* (2009.01)
(Continued)

(52) U.S. Cl.
CPC ......... *H04L 65/4076* (2013.01); *H04W 8/005* (2013.01); *H04W 72/121* (2013.01); *H04W 76/14* (2018.02); *H04W 88/04* (2013.01)

(58) Field of Classification Search
CPC ............ H04L 65/4076; H04W 72/121; H04W 76/023; H04W 76/14; H04W 88/04; H04W 8/005
See application file for complete search history.

(56) References Cited

U.S. PATENT DOCUMENTS 8,995,326 B2   3/2015  Gong
9,143,979 B1   9/2015  Lambert
(Continued)

FOREIGN PATENT DOCUMENTS

CN   101682629 A    3/2010
EP   3 086 610 A1  10/2016
(Continued)

OTHER PUBLICATIONS

Camps-Mur, "Enabling Always on Service Discovery: WiFi Neighbor Awareness Networking", Apr. 29, 2015, 8 pages, vol. 22, Issue 2, IEEE Wireless Communications.
(Continued)

*Primary Examiner* — Asad M Nawaz
*Assistant Examiner* — Berhanu D Belete
(74) *Attorney, Agent, or Firm* — Kowert, Hood, Munyon, Rankin & Goetzel, P.C.

(57) ABSTRACT

In some embodiments, one or more wireless stations operate according to Neighbor Awareness Networking (NAN)—direct communication with neighboring wireless stations, e.g., direct communication between the wireless stations without utilizing an intermediate access point. Embodiments of the disclosure relate to NAN datapath scheduling and NAN pre-datapath operation setup and scheduling. The
(Continued)

--- determine a first scheduler rank attribute based in part on types of data links and a number of data links
502 receive a second scheduler rank attribute from a neighboring wireless device
504 in response to the second scheduler rank being greater than the first scheduler rank, update an advertised rank to the second scheduler rank
506

NAN datapath embodiments described herein provide a mechanism through which devices can communicate and provide services. Aspects of the datapath development include datapath scheduling, including datapath setup and scheduling attributes, as well as pre-datapath operation triggering and scheduling. Scheduling attributes may include a native scheduler rank and a NAN data cluster scheduler rank. NAN data cluster base schedules may be scheduled as equal-sets or subsets of datapath schedules. The datapath model may be implemented for unicast and multicast communication between wireless stations, including mobile stations.

20 Claims, 11 Drawing Sheets

Related U.S. Application Data on Jun. 22, 2015, provisional application No. 62/166,090, filed on May 25, 2015.

(51) Int. Cl.
*H04W 72/12* (2009.01)
*H04W 76/14* (2018.01)
*H04W 88/04* (2009.01)

(56) References Cited

U.S. PATENT DOCUMENTS

| | | | |
|---|---|---|---|
| 9,319,862 B2 | 4/2016 | Kelleman | |
| 9,521,192 B2 | 12/2016 | Qi | |
| 9,544,754 B1 | 1/2017 | Lambert | |
| 9,723,513 B1 | 8/2017 | Lambert | |
| 9,723,582 B1* | 8/2017 | Tran | H04W 48/12 |
| 9,800,389 B2 | 10/2017 | Abraham | |
| 9,872,234 B2 | 1/2018 | Huang et al. | |
| 10,080,182 B2* | 9/2018 | Kim | H04W 4/06 |
| 2006/0171403 A1 | 8/2006 | Kim | |
| 2006/0215583 A1* | 9/2006 | Castagnoli | H04L 45/60 |
| | | | 370/254 |
| 2007/0207727 A1 | 9/2007 | Song | |
| 2008/0005306 A1 | 1/2008 | Kushalnagar | |
| 2008/0137666 A1* | 6/2008 | Fairhurst | H04L 45/40 |
| | | | 370/395.41 |
| 2008/0285507 A1 | 11/2008 | Mukherjee et al. | |
| 2009/0164583 A1 | 6/2009 | Zhu | |
| 2010/0165896 A1 | 7/2010 | Gong | |
| 2010/0165963 A1 | 7/2010 | Chu | |
| 2010/0226342 A1 | 9/2010 | Coiling et al. | |
| 2011/0029659 A1 | 2/2011 | Shah | |
| 2011/0082939 A1 | 4/2011 | Montemurro | |
| 2011/0124282 A1 | 5/2011 | Lee | |
| 2013/0034020 A1 | 2/2013 | Morgan | |
| 2013/0148566 A1 | 6/2013 | Doppler | |
| 2013/0191688 A1* | 7/2013 | Agarwal | H04L 41/0873 |
| | | | 714/32 |
| 2013/0322297 A1 | 12/2013 | Dominguez | |
| 2014/0056248 A1 | 2/2014 | Wang et al. | |
| 2014/0067702 A1 | 3/2014 | Rathod | |
| 2014/0115060 A1 | 4/2014 | Kim | |
| 2014/0177510 A1 | 6/2014 | Tajima | |
| 2014/0269555 A1 | 9/2014 | Sadasivam et al. | |
| 2014/0301190 A1 | 10/2014 | Abraham et al. | |
| 2014/0313966 A1 | 10/2014 | Shukla et al. | |
| 2014/0313967 A1 | 10/2014 | Cha | |
| 2014/0321317 A1 | 10/2014 | Kasslin | |
| 2014/0323110 A1 | 10/2014 | Moon | |
| 2014/0328168 A1 | 11/2014 | Park et al. | |
| 2014/0357269 A1 | 12/2014 | Zhou | |
| 2015/0006633 A1 | 1/2015 | Vandwalle et al. | |
| 2015/0036540 A1* | 2/2015 | Kasslin | H04W 48/18 |
| | | | 370/254 |
| 2015/0071121 A1* | 3/2015 | Patil | H04W 40/24 |
| | | | 370/255 |
| 2015/0081840 A1 | 3/2015 | Patil et al. | |
| 2015/0098388 A1 | 4/2015 | Fang | |
| 2015/0109961 A1 | 4/2015 | Patil | |
| 2015/0109981 A1* | 4/2015 | Patil | H04L 67/1078 |
| | | | 370/311 |
| 2015/0172757 A1 | 6/2015 | Kafle | |
| 2015/0200811 A1* | 7/2015 | Kasslin | H04L 41/0853 |
| | | | 370/254 |
| 2015/0208455 A1 | 7/2015 | Yen et al. | |
| 2015/0245335 A1* | 8/2015 | Zhou | H04L 1/00 |
| | | | 370/329 |
| 2015/0256992 A1 | 9/2015 | Kelleman | |
| 2015/0282149 A1 | 10/2015 | Abraham | |
| 2015/0296458 A1 | 10/2015 | Abraham et al. | |
| 2015/0319029 A1 | 11/2015 | Abraham et al. | |
| 2015/0319235 A1 | 11/2015 | Liu et al. | |
| 2015/0319675 A1* | 11/2015 | Park | H04W 48/16 |
| | | | 370/338 |
| 2015/0341447 A1 | 11/2015 | Patil et al. | |
| 2015/0341811 A1 | 11/2015 | Deshpande et al. | |
| 2015/0350866 A1 | 12/2015 | Patil et al. | |
| 2015/0351146 A1 | 12/2015 | Lee | |
| 2016/0014669 A1 | 1/2016 | Patil et al. | |
| 2016/0014694 A1* | 1/2016 | Patil | H04W 8/005 |
| | | | 370/254 |
| 2016/0014714 A1 | 1/2016 | Patil et al. | |
| 2016/0014715 A1 | 1/2016 | Patil | |
| 2016/0020967 A1* | 1/2016 | Thubert | H04W 40/248 |
| | | | 370/252 |
| 2016/0029403 A1 | 1/2016 | Roy et al. | |
| 2016/0073288 A1 | 3/2016 | Patil et al. | |
| 2016/0073330 A1 | 3/2016 | Patil | |
| 2016/0088611 A1 | 3/2016 | Abraham | |
| 2016/0157089 A1 | 6/2016 | Qi et al. | |
| 2016/0165653 A1 | 6/2016 | Liu et al. | |
| 2016/0174225 A1* | 6/2016 | Patil | H04W 68/005 |
| | | | 370/329 |
| 2016/0241433 A1* | 8/2016 | Huang | H04W 48/16 |
| 2016/0249200 A1 | 8/2016 | Liu et al. | |
| 2016/0283283 A1* | 9/2016 | Jung | G06F 9/5033 |
| 2016/0286398 A1* | 9/2016 | Abraham | H04L 63/123 |
| 2016/0286572 A1* | 9/2016 | Abraham | H04L 63/065 |
| 2016/0309496 A1* | 10/2016 | Huang | H04W 52/0216 |
| 2016/0337836 A1 | 11/2016 | Kim | |
| 2016/0374107 A1 | 12/2016 | Das | |
| 2017/0034769 A1* | 2/2017 | Kim | H04W 48/08 |
| 2017/0359819 A1 | 12/2017 | Wang | |
| 2018/0070308 A1* | 3/2018 | Park | H04W 48/16 |

FOREIGN PATENT DOCUMENTS

| | | |
|---|---|---|
| WO | 2014124251 A2 | 8/2014 |
| WO | WO 2016/007779 A1 | 1/2016 |
| WO | WO 2016/094446 A1 | 6/2016 |
| WO | WO 2016/154199 A1 | 9/2016 |

OTHER PUBLICATIONS

Communication pursuant to Article 94(3) EPC, European Patent application 15816336.0, dated May 28, 2019, 14 pages.
Office Action, Chinese Application for Invention No. 201580064406.9, dated Sep. 4, 2019, six pages.

* cited by examiner

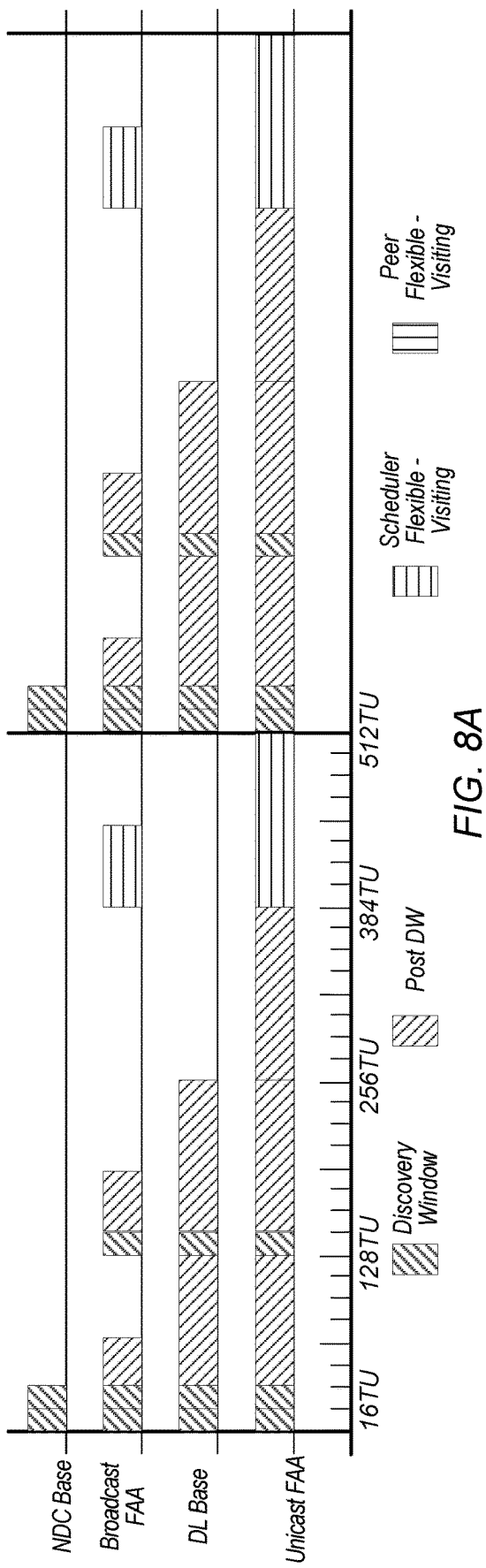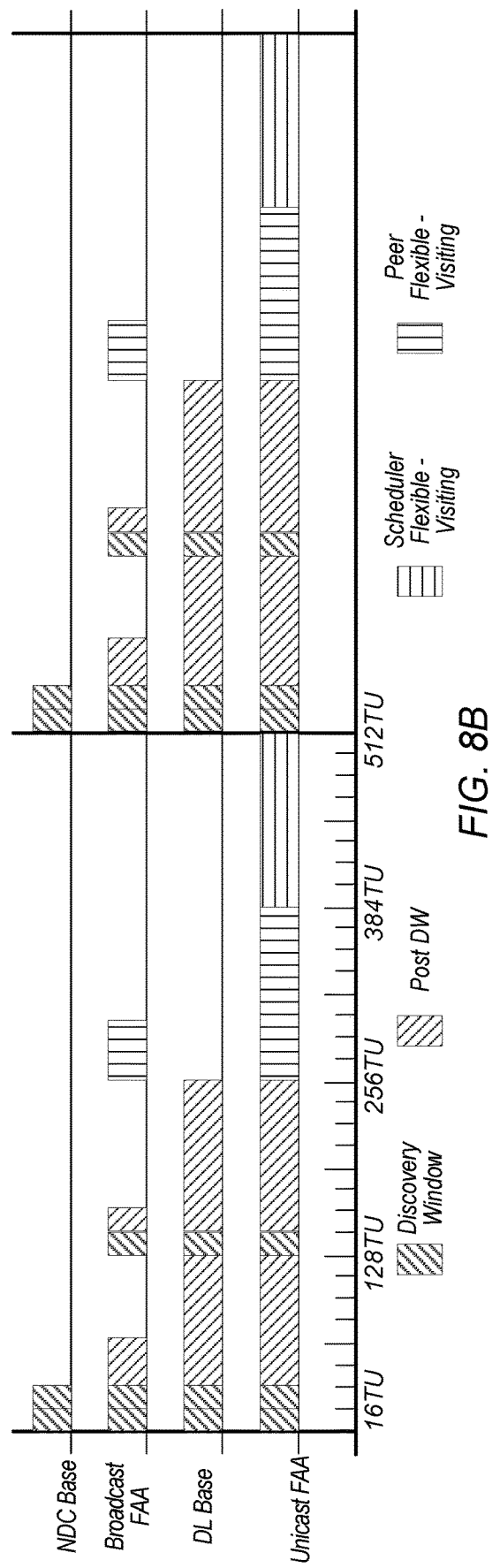

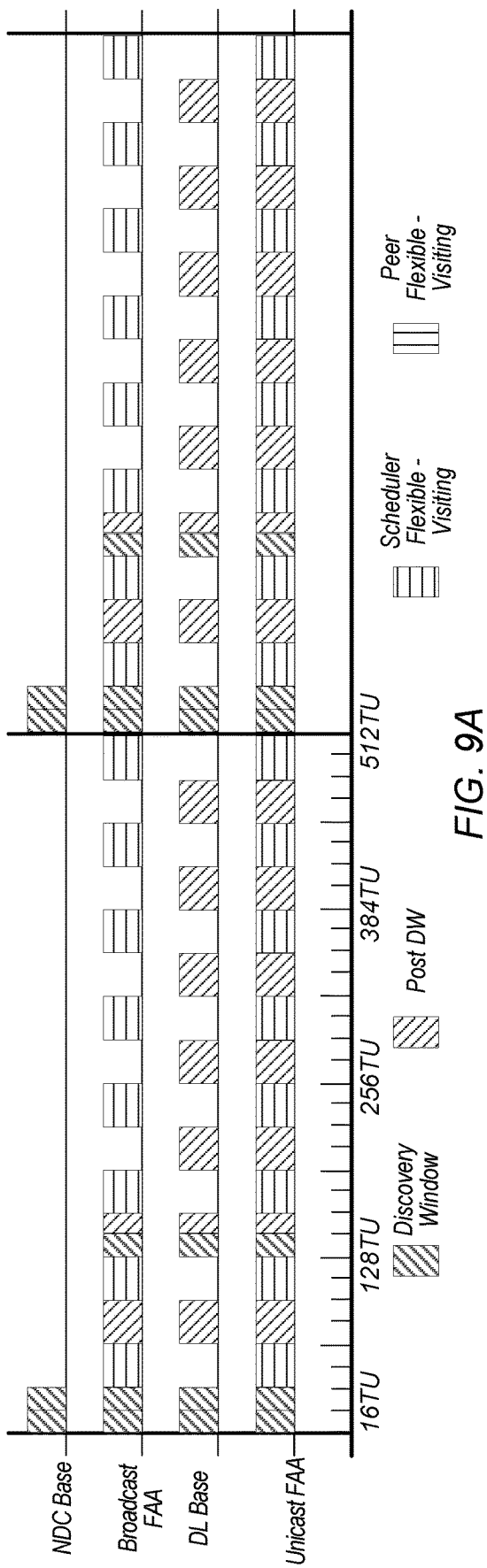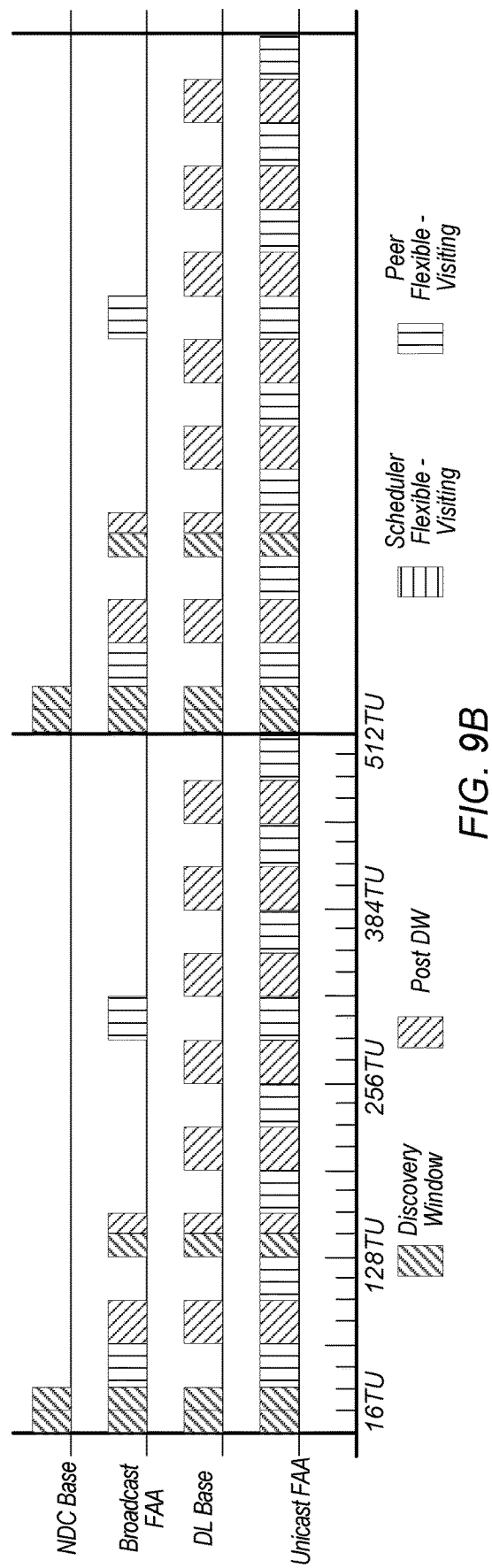
FIG. 9A
FIG. 9B

NEIGHBOR AWARENESS NETWORKING DATAPATH—SCHEDULING, SCHEDULER RANK, AND PRE-DATAPATH OPERATION TRIGGERING

PRIORITY DATA

This application claims benefit of priority to U.S. Provisional Application Ser. No. 62/166,090, titled "Neighbor Awareness Networking Datapath", filed May 25, 2015, by Yong Liu, Christiaan A. Hartman, Daniel R. Borges, Peter Heerboth, Lawrie Kurian, Su Khiong Yong, Anand Rajagopalan, Saravanan Balasubramaniyan, Tashbeeb Haque, Andreas Wolf, Guoqing Li, Lilach Zukerman, and Oren Shani, to U.S. Provisional Application Ser. No. 62/182,920, titled "Neighbor Awareness Networking Datapath", filed Jun. 22, 2015, by Yong Liu, Christiaan A. Hartman, Daniel R. Borges, Peter Heerboth, Lawrie Kurian, Su Khiong Yong, Anand Rajagopalan, Saravanan Balasubramaniyan, Tashbeeb Haque, Andreas Wolf, Guoqing Li, Lilach Zukerman, and Oren Shani, and to U.S. Provisional Application Ser. No. 62/188,891, titled "Neighbor Awareness Networking Datapath", filed Jul. 6, 2015, by Yong Liu, Christiaan A. Hartman, Daniel R. Borges, Peter Heerboth, Lawrie Kurian, Su Khiong Yong, Anand Rajagopalan, Saravanan Balasubramaniyan, Tashbeeb Haque, Andreas Wolf, Guoqing Li, Lilach Zukerman, and Oren Shani, each of which is hereby incorporated by reference in its entirety as though fully and completely set forth herein.

FIELD

The present application relates to wireless communications, including techniques for wireless communication among mobile stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to systems and methods for datapath scheduling and synchronization between peer devices.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate according to Neighbor Awareness Networking (NAN)—direct communication with neighboring wireless stations, e.g., direct communication between the wireless stations without utilizing an intermediate access point. Embodiments of the disclosure relate to NAN datapath scheduling and NAN pre-datapath operation setup and scheduling. The NAN datapath embodiments described herein provide a mechanism through which devices can communicate and provide services. Aspects of the datapath development include datapath scheduling, including datapath setup and scheduling attributes, as well as pre-datapath operation triggering and scheduling. Scheduling attributes may include a native scheduler rank and a NAN data cluster scheduler rank. NAN data cluster base schedules may be scheduled as equal-sets or subsets of datapath schedules. The datapath model may be implemented for unicast and multicast communication between wireless stations, including mobile stations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 8A and 8B illustrate example frame schedules for a scheduler (FIG. 8A) and a non-scheduler (FIG. 8B), according to some embodiments.

FIGS. 9A-9B illustrate example frame schedules for a scheduler (FIG. 9A) and a non-scheduler (FIG. 9B) for support of low latency applications, according to some embodiments.

Figure 1:
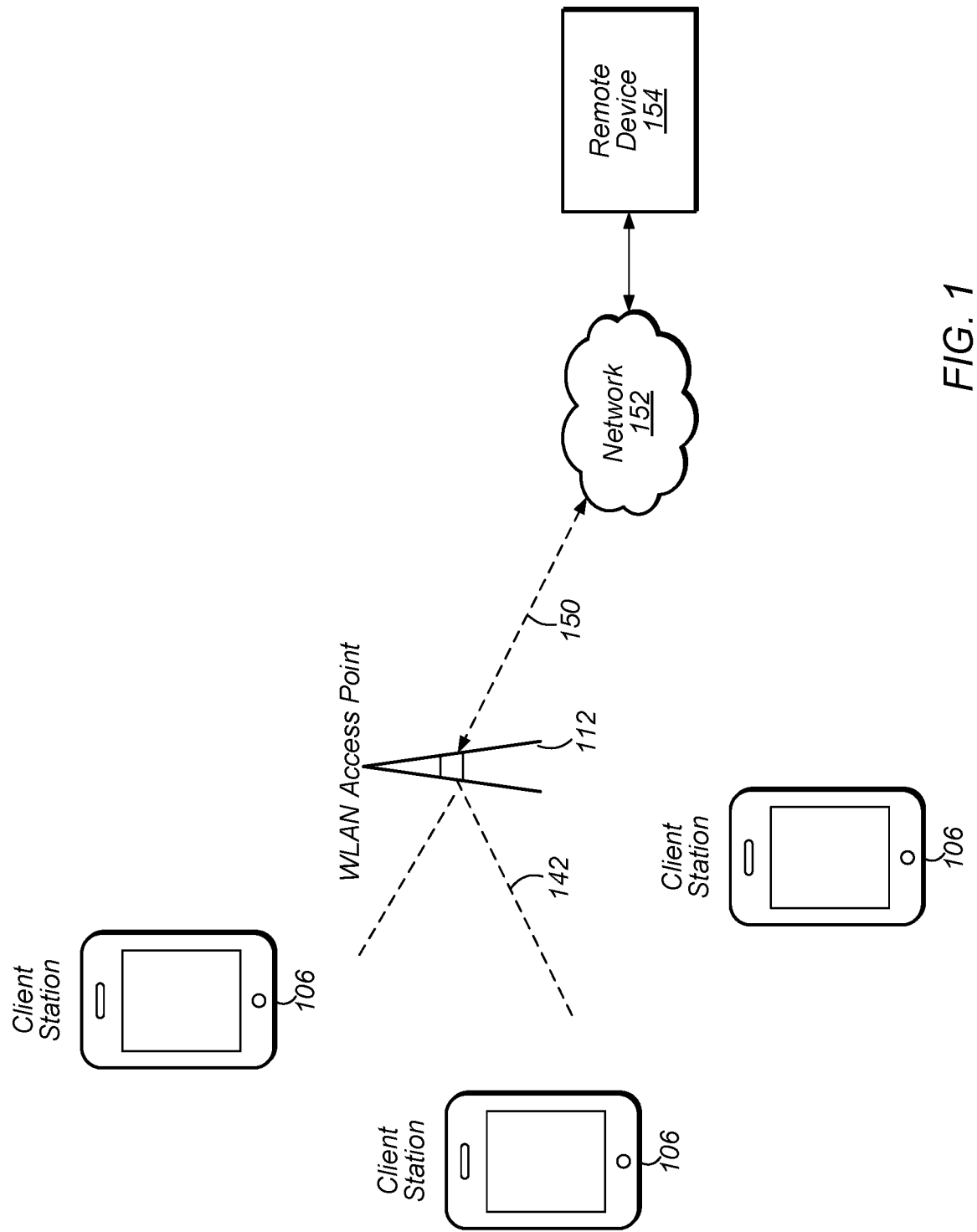
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

In some embodiments, as further described below, a wireless device 106 may be configured to perform methods for managing scheduler rank, negotiating base schedules for data links and data clusters, and triggering pre-datapath operations.

Figure 2:
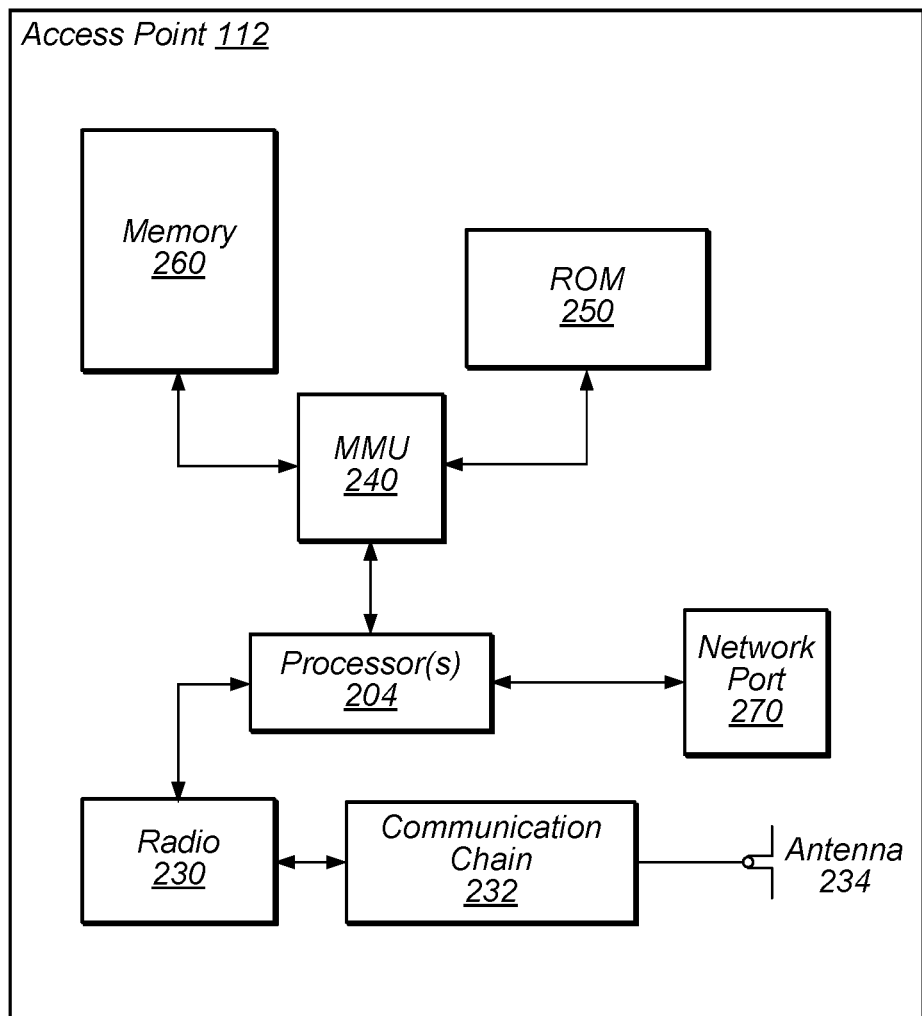
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for managing scheduler rank, negotiating base schedules for data links and data clusters, and triggering pre-datapath operations.

Figure 3:
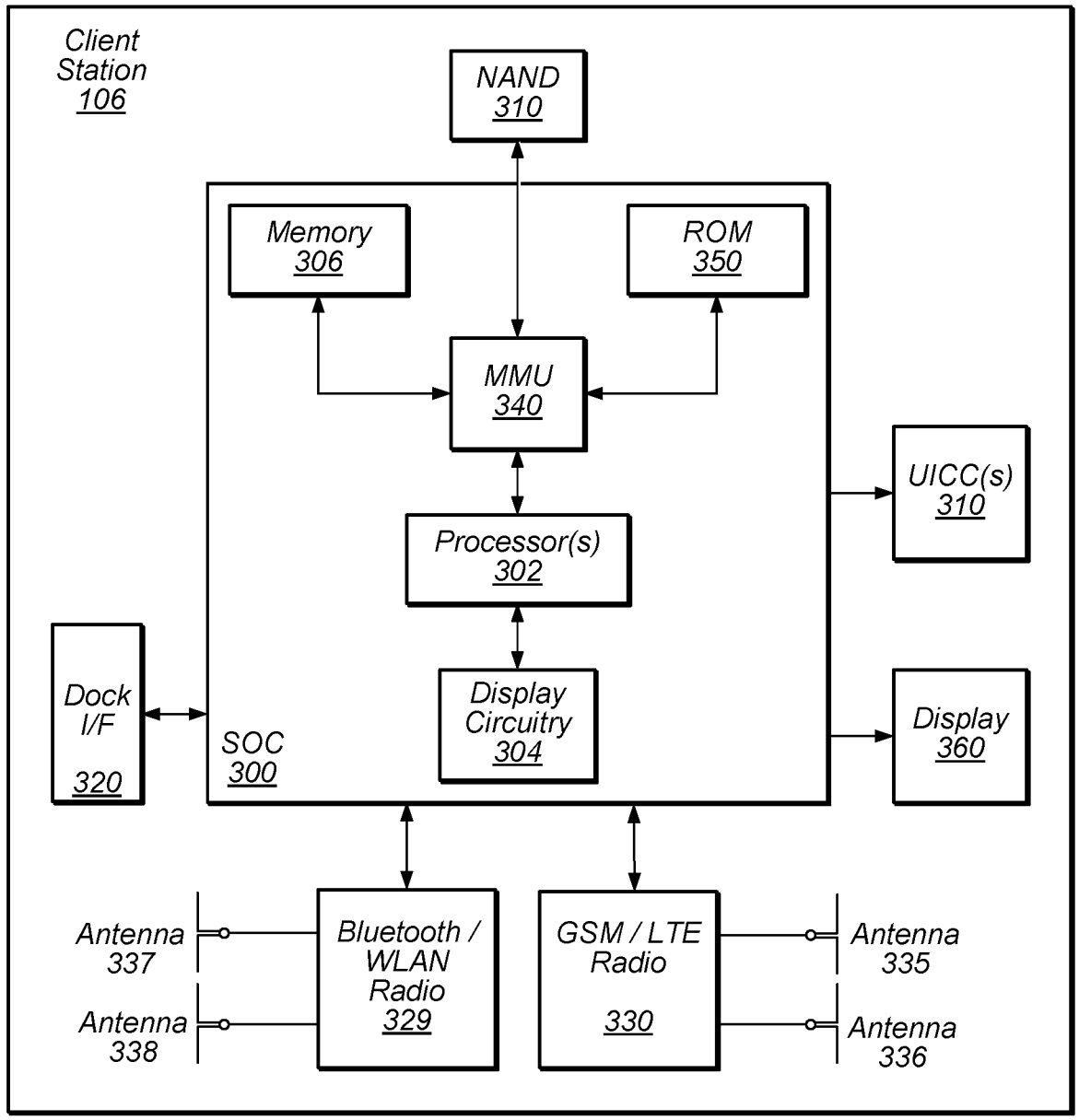
FIG. 3 illustrates an example simplified block diagram of a mobile station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for managing scheduler rank, negotiating base schedules for data links and data clusters, and triggering pre-datapath operations.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for datapath scheduling and pre-datapath operations, including pre-datapath scheduling and triggering, management of datapath scheduler rank and management of datapath scheduler rank within a NAN data cluster, and management of datapath types and scheduling management of datapaths within a NAN data cluster.

Wi-Fi NAN Datapath Scheduling

In some embodiments, when two NAN devices meet and decide to establish a datapath (e.g., a unicast datapath, referred to as a NAN data link (NDL)), the NAN devices may agree on a base schedule for the datapath (NDL) with minimal negotiation overhead. Both devices may announce schedule preferences and limitations and one of the NAN devices may be elected as the scheduler for the datapath (datapath scheduler or NDL scheduler). The datapath (NDL) scheduler may determine the base schedule for the datapath based at least in part on the announced schedule preferences and limitations. Note that each NAN device may add individual schedules on top of the base schedule to create combined schedules for a NAN device and may announce the combined schedules as the NAN device's availability schedule. In some embodiments, an individual schedule may be added to a base schedule when a particular NAN device cannot follow the base schedule for certain time periods. For example, a NAN device may not be able to follow the base schedule for certain time periods if the NAN device has a concurrent NDL that may require the NAN device to switch to a different channel. As another example, a NAN device may not be able to follow the base schedule for certain time periods if the NAN device needs to switch off its Wi-Fi radio for multi-radio co-existence purposes.

In some embodiments, when a NAN device (device) announces availability schedules, which may include its individual schedule(s), peer NAN devices (devices) may make use of the device's individual schedule(s) by switching together with the device to maintain continuous communications. Note that there may be at least two types of individual schedule(s). A flexible individual schedule is an individual schedule that may be adjusted to align with discovery window (DW) intervals, further availability time slots, a base schedule, a peer device's availability schedules, and so forth. An inflexible individual schedule is an individual schedule that may not be adjusted.

In some embodiments, each device may maintain a scheduler rank (e.g., a native scheduler rank (NSR)) and include the scheduler rank value in some or all of its service discovery frames (SDFs). The scheduler rank may include a schedule priority field and a tie break field. The value of the schedule priority field may be increased whenever the device adds an active datapath (NDL) and may be increased more if an added datapath requires higher quality of service (QoS) support (e.g., a video or audio service) as further detailed below. Additionally, the value of the schedule priority field may be decreased whenever an active datapath is closed (or terminated) and may be decrease more if a closed datapath required higher QoS support (e.g., a video or audio service). In some embodiments, the value of the tie break field may be a combination of a random number and the device's MAC address. Thus, when the device receives the scheduler rank (e.g., an NSR) from a peer device (e.g., a datapath candidate), it may determine its scheduling role for the datapath by comparing its own scheduler rank (e.g., NSR) with the peer device's scheduler rank. If the device has a higher scheduler rank than the peer device, then the device may be the scheduler. If the device has a lower scheduler rank than the peer device, then the peer device may become the scheduler. The device that is not the scheduler (i.e., the non-scheduler) establishes a base schedule with a scheduler for a datapath and may inherit the scheduler's scheduler rank as its own scheduler rank.

NAN Data Link, NAN Data Cluster, and Scheduler Rank Management

As noted above, NAN devices may establish a NAN datapath (i.e., a NAN data link (NDL)) with a peer NAN device to exchange data frames for one or more services. Additionally, a NAN data cluster (NDC) may include NAN devices (e.g., client stations 106) that may be interconnected by one or more NDLs. Note that all NAN devices in a NDC may all be part of a larger NAN cluster. In other words, a NAN data cluster may include a group of NAN devices having established NDLs among each other. As used herein, a NDC refers to a group of NAN devices having at least one active NDL with at least one member NAN device of the same cluster. Each NAN device in a NDC may maintain a native rank value (e.g., a NSR) and an advertised rank value (e.g., a NAN data cluster scheduler rank (DCSR)) as described in further detail below. Further, in a NDC, all member NAN devices may maintain tight synchronization amongst each other and each NAN device of the NDC may be present at a common (i.e., same) further availability time slot (or window) as indicated by an NDC base schedule. In addition, within a NDC, each NDL may have a NDL base schedule. Thus, two (or more) NAN devices that established the NDL may be present at a common (i.e., same) further availability time slot (or window) indicated by the NDL base schedule and the NDL base schedule may be a superset of a NDC base schedule.

In some embodiments, a system of scheduler rank management may be implemented for a NAN data cluster (data cluster). Each NAN device in a data cluster may maintain a native rank value and an advertised rank value. Multiple NAN devices in a data cluster may be presented as having the form of a tree, with the NAN device having the highest native rank being the root of the tree. To avoid "tie" scenarios, wherein multiple NAN devices may share the same native rank, a tie break value (e.g., a MAC address as discussed above) may be associated with the native rank of each NAN device, or may be incorporated into the initial calculation of the native rank to avoid equivalent native rank values in a comparison of two NAN devices within the data cluster.

In some embodiments, each NAN device may maintain several values associated with its scheduler rank for the purpose of determining its scheduling role in establishing connections (e.g., NDLs) with other NAN devices. These values may comprise a native rank (e.g., a NSR), an advertised rank, and an advertised rank update indicator. The native rank may represent a baseline scheduling priority value for the NAN device. The native rank may be determined based on the scheduling flexibility and the local scheduling constraints of the NAN device (e.g., due to the resource usage and/or demands of Bluetooth, Wi-Fi Direct, NAN, etc.).

In addition, in some embodiments, a NAN device may also maintain a data cluster scheduler rank (DCSR), which along with the NAN device's native rank (e.g., NSR), may be used as arbiters to decide NDC and NDL base schedules. As notes above, a NSR may include multiple components such as a schedule priority, a tie breaker (e.g., a NAN interface address or MAC address), and/or a current timestamp. Further, a NAN device with more constraints on creating or changing its current further availability schedule may have a higher numerical value of NSR schedule priority. In addition, a NAN device may set its DCSR equal to its NSR if it does not have any active (or current) NDLs.

For example, in some embodiments, a NAN device may follow various rules (or procedures/protocols) regarding when and how to increment or decrement its NSR schedule priority. For example, the NAN device may increment its NSR schedule priority based on a type of data session and a scheduling constraint that may be required for each type of data session. Thus, the NAN device may increment its NSR schedule priority by a greater amount upon creation of a voice data session (e.g., an AC_VO data session) as compared to other types of data sessions such as video (e.g., an AC_VI data session) and/or a background/best effort (e.g., an AC_BK or AC_BE data session). Similarly, the NAN device may decrease its NSR schedule priority by a greater amount upon the termination of a voice data session as compared to other types of data session such as video and/or a background/best effort data session. In addition, a multicast data session may be weighted more heavily than a unicast data session.

As an example, according to some embodiments, a NAN device may increase its NSR schedule priority value by 1 when the NAN device adds a background or best effort data session, by 2 when the NAN device adds a video data session (unicast), by 3 when the NAN device adds a voice data session (unicast) data session, by 5 when the NAN device adds a background or best effort multicast data session as a multicast source, by 8 when the NAN device adds a video multicast data session as a multicast source, and/or by 10 when the NAN device adds a voice multicast data session as a multicast source. Similarly, the NAN device may decrease its NSR schedule priority value by 1 when the NAN device removes a background or best effort data session, by 2 when the NAN device removes a video data session (unicast), by 3 when the NAN device removes voice data session (unicast) data session, by 5 when the NAN device removes a background or best effort multicast data session as a multicast source, by 8 when the NAN device removes a video multicast data session as a multicast source, and/or by 10 when the NAN device removes a voice multicast data session as a multicast source. Note that these values are exemplary only and other values may be used.

In addition, in some embodiments, a NAN device may follow various rules (or procedures/protocols) for scheduling in a NAN data cluster to determine, maintain, and/or update its NAN data cluster scheduler rank (DCSR). For example, a NAN device that has a DCSR equal to its NSR and at least one active NDL may be considered as a NDC-scheduler. The NDC-scheduler may periodically transmit its DCSR (equivalent to its NSR) to all active NDL peers. In response, a NAN device that is not a NDC-scheduler may update its DCSR with a received DCSR from an active NDL peer based on one or more criteria. Thus, if the received DCSR is larger than the NAN device's recorded DCSR and if a timestamp of the received DCSR is recent, then the NAN device may update its DCSR. Whether the received DCSR timestamp is or is not recent may be based at least in part on a difference between a current timestamp and the received DCSR timestamp being less than a specified threshold. Note that the specified threshold may be based at least in part on a number of discovery windows. For example, if a specified number of discovery windows (e.g., 2, 4, 8, 16, 32, 64, etc., discovery windows) has passed since the timestamp of the received DCSR, then the received DCSR may not be considered recent. However, if less discovery windows than the specified number of discovery windows have passed since the timestamp of the received DCSR, then the received DCSR may be considered recent.

As another example, a NAN device may reset its DCSR to the NAN device's NSR if its recorded DCSR becomes outdated (e.g. the difference between its current timestamp and a recorded DCSR timestamp is greater than a specified threshold such as a number of discover windows) and/or if its NSR becomes larger than the recorded DCSR. Note that upon updating its DCSR, the NAN device may transmit an updated DCSR to all active NDL peers. Further, if a NAN device becomes a NDC-scheduler, it may change the NDC base schedule after remaining in the NDC-scheduler role for a specified number of discover windows (e.g., 2, 4, 8, 16, 32, 64, etc., discovery windows). In other words, in some embodiments, if a NAN device becomes the NDC-scheduler, it may change the NDC base schedule after it has been the NDC-scheduler for a specified number of consecutive discovery windows.

In some embodiments, a NAN device that is not a NDC-scheduler may designate (or mark) one or more NDL peers as parent peers if those NDL peers have transmitted larger and/or more recent DCSR than its recorded DCSR. Additionally, the NAN device may reset (or update) its DCSR to its NSR upon terminating all NDLs with all parent peers in contrast to waiting for the recorded DCSR to become outdated. Note that if the NAN device still has active NDL(s) with one or more non-parent peers, the NAN device may assume the role of NDC-scheduler for the remaining active NDL(s) and may start to transmit its DCSR periodically to all active NDL peers at least until it updates its DCSR to a value larger than its NSR. In addition, the NAN device may maintain a record (e.g., data structure) of retired DCSR to filter out any loop back DCSR transmissions from non-parent peers.

In some embodiments, a NAN device may determine to retire (e.g., discontinue using) its DCSR if all designated parent peers start to transmit smaller DCSRs than the NAN device's recorded DCSR. Note that after the NAN device retires its current DCSR, the NAN device may set (or update) its DCSR to the larger of its own NSR or the largest DCSR it receives from its parent peers. In addition, the NAN device may maintain a record (e.g., data structure) of retired DCSR to filter out any loop back DCSR transmissions from non-parent peers.

Figure 4A:
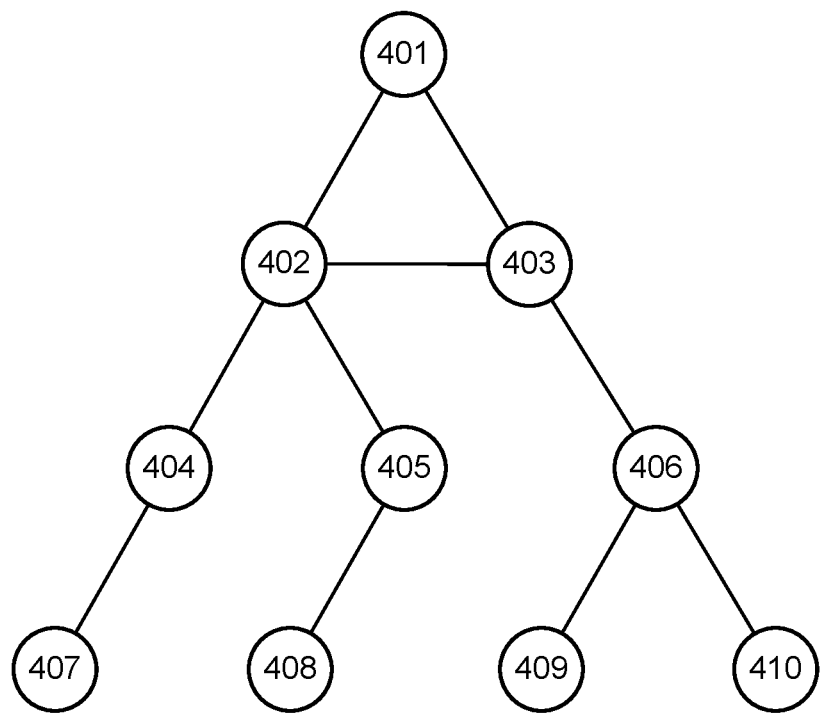
FIGS. 4A-4B illustrate an example of a data cluster scheduler rank operation according to some embodiments.
Figure 4B:
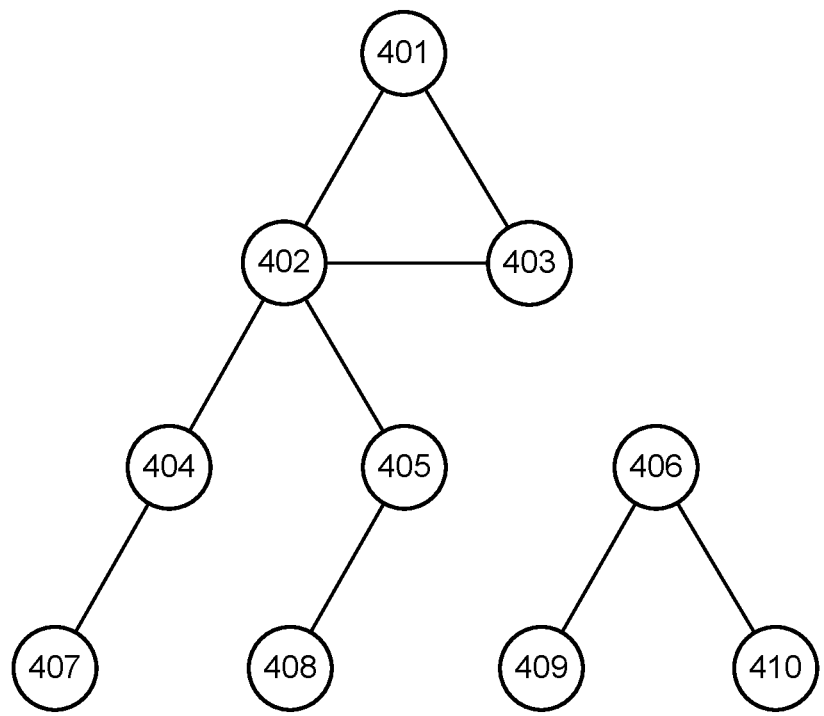

FIGS. 4A-4B illustrate an example of a DCSR operation according to some embodiments. The NAN devices illustrated in FIGS. 4A-4B may have similar features as described above in reference to client station 106. As illustrated in FIG. 4A, NAN devices 407, 408, 409, and 410 may have a NSR of 2, NAN devices 401, 404, and 405 may have a NSR of 4, NAN devices 403 and 406 may have a NSR of 6, and NAN device 402 may have a NSR of 8. Thus, NAN device 402 may be considered as a NDC-scheduler based on NAN device 2 having a highest NSR and a corresponding DCSR of 8. As illustrated, NAN device 402 may have NDLs with NAN devices 401, 403, 404, and 405 and NAN devices 401, 403, 404, and 405, having lower NSRs than NAN device 402, may inherit the NSR of NAN device 2 as their DCSR. NAN device 404 may have an additional NDL with NAN device 407 and may propagate the NSR (i.e., the DCSR) of NAN device 402 to NAN device 407. Similarly, NAN device 405 may have an additional NDL with NAN device 408 and may propagate the NSR of NAN device 402 to NAN device 408. NAN device 401 may have an additional NDL with NAN device 403 and, in turn, NAN device 403 may have an additional NDL with NAN device 406 and may propagate the NSR of NAN device 402 to NAN device 406. NAN device 406 may have additional NDLs with NAN devices 409 and 410 and may propagate the NSR of NAN device 402 to NAN devices 409 and 4010. Thus, each device may have a DCSR equal to the NSR of the NDC-scheduler. Further, NAN devices 409 and 410 may each designate NAN device 6 as a parent-peer.

Turning to FIG. 4B, the NDL between NAN device 403 and NAN device 406 may be terminated (or lost). Thus, a new NDC between NAN devices 406, 409, and 410 may be established. Additionally, NAN device 406 may update its NSR to account for the lost NDL with NAN device 403. After updating its NSR, NAN device 406 may determine that its NSR remains greater than the NSR of other NAN devices (e.g., NAN devices 409 and 410) within the new NDC. Thus, NAN device 406 may assume a role of NDC-scheduler and may transmit an updated DCSR to NAN devices 409 and 410. Note that in some embodiments, after maintaining the role of NDC-scheduler for a specified number of discovery windows (e.g., 2, 4, 8, 16, 32, 64, etc., discovery windows), NAN device 406 may update the schedule for the new NDC. Note that when a NAN device establishes a NDL with a peer NAN device, the two devices may first compare (e.g., exchange) their respective DCSRs and the NAN device with the higher DCSR may schedule (e.g., become a scheduler of) the NDL. In addition, the NAN device with the higher DCSR may also determine the base schedule for the NDL.

Figure 5A:
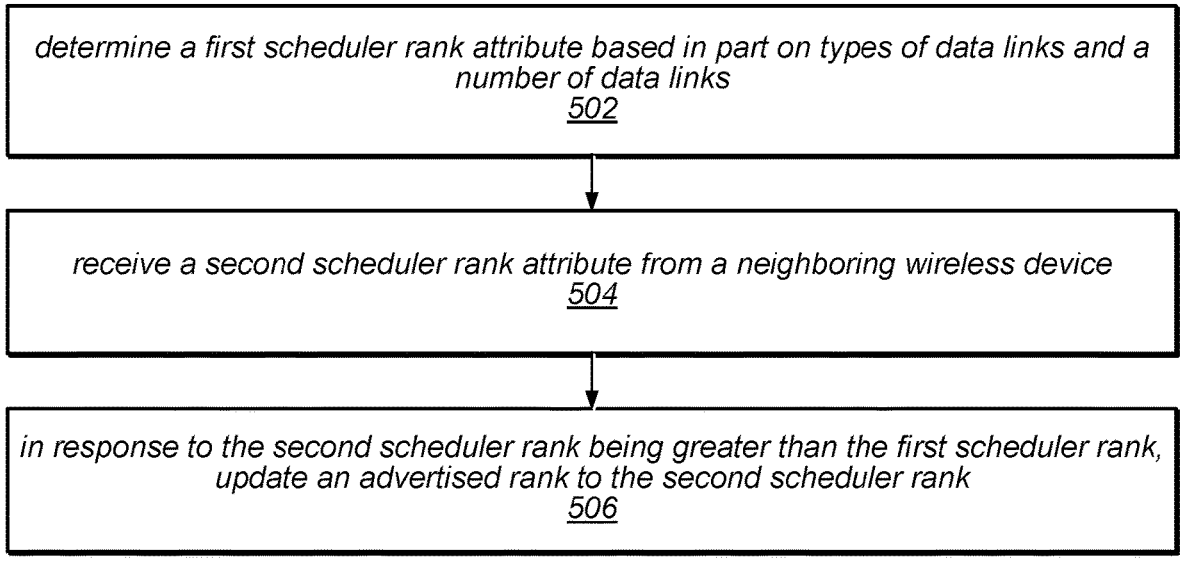
FIG. 5A illustrates a block diagram of an example of a method for a wireless station to update its scheduler rank, according to some embodiments.

FIG. 5A illustrates a block diagram of an example of a method for a wireless station to update its scheduler rank, according to some embodiments. The method shown in FIG. 5A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502, a wireless station (e.g., such as client station 106) may determine a scheduler rank attribute. As described above, the scheduler rank attribute may be based in part on a number of data links associated with the wireless station and/or types of data links associated the wireless station. In other words, the greater the number of data links associated with the wireless station, the larger the scheduler rank attribute of the wireless station. Similarly, if the data links require higher QoS as described above, the scheduler rank attribute may also be increased. In some embodiments, the scheduler rank may be a native scheduler rank. In some embodiments, the wireless station may advertise the scheduler rank attribute as an advertised scheduler rank. The advertisement may be a unicast or multicast message. In some embodiments, the advertised scheduler rank may be included in a unicast or multicast service discovery frame (SDF). In some embodiments, the scheduler rank may be a native rank of the wireless station.

At 504, the wireless station may receive a scheduler rank attribute from a neighboring wireless station. As described above, the scheduler rank attribute of the neighboring wireless station may be based in part on a number of data links associated with the neighboring wireless station and/or types of data links associated the neighboring wireless station. In other words, the greater the number of data links associated with the neighboring wireless station, the larger the scheduler rank attribute of the neighboring wireless station. Similarly, if the data links require higher QoS as described above, the scheduler rank attribute of the neighboring wireless station may also be increased.

At 506, in response to determining that the scheduler rank attribute of the neighboring wireless station is greater than the scheduler rank attribute of the wireless station, the wireless station may update the advertised rank to the scheduler rank attribute of the neighboring wireless station. In some embodiments, the wireless station may receive a base scheduler form the neighboring wireless device. In some embodiments, the wireless station may mark (or flag) the neighboring wireless station as a parent peer device.

In some embodiments, in response to determining that the scheduler rank attribute of the neighboring wireless station is less than the scheduler rank attribute of the wireless station, the wireless station may determine that the wireless station is a scheduler for a data link (e.g., a NAN datapath or NAN data link) to be scheduled with the neighboring wireless station. In some embodiments, the wireless station may determine and transmit a data link base schedule to the neighboring wireless station.

Figure 5B:
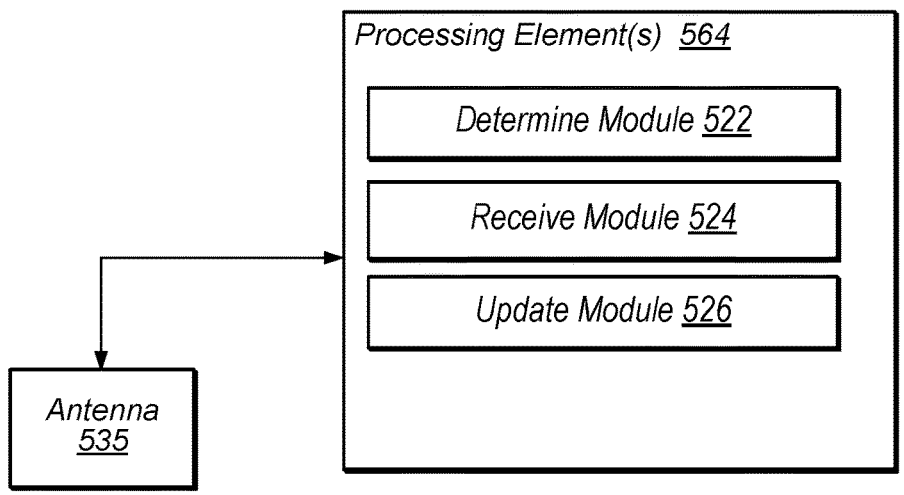
FIG. 5B illustrates an example of a processing element including modules for a wireless station to update its scheduler rank, according to some embodiments.

FIG. 5B illustrates an example of a processing element including modules for a wireless station to update its scheduler rank, according to some embodiments. In some embodiments, antenna 535 may be coupled (directly or indirectly) to processing element 564. The processing element may be configured to perform the method described above in reference to FIG. 5A. In some embodiments, processing element 535 may include one or more modules, such as modules (or circuitry) 522-526, and the modules (or circuitry) may be configured to perform various operations of the method described above in reference to FIG. 5A. In some embodiments, the processing element may be included in a wireless station, such as client station 106. As shown, the modules may be configured as follows.

In some embodiments, processing element 564 may include a determine module 522 configured determine a scheduler rank attribute. As described above, the scheduler rank attribute may be based in part on a number of data links associated with the wireless station and/or types of data links associated the wireless station. In other words, the greater the number of data links associated with the wireless station, the larger the scheduler rank attribute of the wireless station. Similarly, if the data links require higher QoS as described above, the scheduler rank attribute may also be increased. In some embodiments, the scheduler rank may be a native scheduler rank. In some embodiments, the wireless station may advertise the scheduler rank attribute as an advertised scheduler rank. The advertisement may be a unicast or multicast message. In some embodiments, the advertised scheduler rank may be included in a unicast or multicast service discovery frame (SDF). In some embodiments, the scheduler rank may be a native rank of the wireless station.

In some embodiments, processing element 564 may include a receive module 524 configured to receive a scheduler rank attribute from a neighboring wireless station. As described above, the scheduler rank attribute of the neighboring wireless station may be based in part on a number of data links associated with the neighboring wireless station and/or types of data links associated the neighboring wireless station. In other words, the greater the number of data links associated with the neighboring wireless station, the larger the scheduler rank attribute of the neighboring wireless station. Similarly, if the data links require higher QoS as described above, the scheduler rank attribute of the neighboring wireless station may also be increased.

In some embodiments, processing element 564 may include an update module 526 configured to update, in response to determining that the scheduler rank attribute of the neighboring wireless station is greater than the scheduler rank attribute of the wireless station, the advertised rank to the scheduler rank attribute of the neighboring wireless station. In some embodiments, the wireless station may receive a base scheduler form the neighboring wireless device. In some embodiments, the wireless station may mark (or flag) the neighboring wireless station as a parent peer device.

In some embodiments, in response to determining that the scheduler rank attribute of the neighboring wireless station is less than the scheduler rank attribute of the wireless station, the processing unit may determine that the wireless station is a scheduler for a data link (e.g., a NAN datapath or NAN data link) to be scheduled with the neighboring wireless station. In some embodiments, the wireless station may determine and transmit a data link base schedule to the neighboring wireless station.

It is apparent for those skilled in the art that, for the particular processes of the modules (or circuitry) described above (such as modules 522, 524, and 526) reference may be made to the corresponding operations (such as operations 502, 504, and 506, respectively) in the related process embodiment sharing the same concept and the reference is regarded as the disclosure of the related modules (or circuitry) as well. Furthermore, processing element 564 may be implemented in software, hardware or combination thereof. More specifically, processing element 564 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 564 may be implemented as a general-purpose processor such as a CPU, and therefore each module can be implemented with the CPU executing instructions stored in a memory which perform a respective operation.

NAN Datapath Scheduling

As noted above, NAN devices may establish a NAN datapath (i.e., a NAN data link (NDL)) with a peer NAN device to exchange data frames for one or more services. Additionally, a NAN data cluster (NDC) may include NAN devices (e.g., client stations 106) that may be interconnected by one or more NDLs. Note that all NAN devices in a NDC may all be part of a larger NAN cluster. In other words, a NAN data cluster may include a group of NAN devices having established NDLs among each other. Each NAN device in a NDC may maintain a native rank value (e.g., a NSR) and an advertised rank value (e.g., a NAN data cluster scheduler rank (DCSR)) as described above. Further, in a NDC, all member NAN devices may maintain tight synchronization amongst each other and each NAN device of the NDC may be present at a common (i.e., same) further availability time slot (or window) as indicated by an NDC base schedule. In addition, within a NDC, each NDL may have a NDL base schedule. Thus, two (or more) NAN devices that established the NDL may be present at a common (i.e., same) further availability time slot (or window) indicated by the NDL base schedule and the NDL base schedule may be a superset of a NDC base schedule.

In some embodiments, a NAN device may initiate establishment of a service data session (SDS) upon receiving a connect session request primitive from an upper layer on the NAN device. Thus, a NAN device pair may establish a NAN data link (NDL) to support one or more SDSs for one or more services. In addition, as noted above, a NAN data cluster (NDC) may include (or be defined as) a set of NAN devices in the same NAN cluster that may share a common base schedule (e.g., a NDC base schedule) where each member NAN device may have at least one NDL with another member NAN device within the same NDC. Note that a NAN device may be a member of more than one NDC and each NDL may belong to only one NDC. Hence, each new NDL may either create a new NDC with a new NDC base schedule or join an existing NDC (with an existing NDC base schedule). In addition, an NDC base schedule may be determined by one of the members of the NDC.

In some embodiments, a NDL schedule may include one or more NDL time blocks in each discovery window (DW) interval. Note that each NDL time block may include a paging window (PW) and a data transmission window (DTW). Thus, two (or more) NAN devices that establish an NDL may be present at a PW of each NDL time block and may transmit a paging message to indicate pending data (to be transmitted during the DTW of the NDL time block), if any, for NAN peer devices. When a NAN device receives a NAN peer device's pending data indication during a PW, the NAN device may transmit a trigger message to the NAN peer device to solicit pending Data from a start of a subsequent DTW. Such paging and triggering may provide a two-way availability indication/confirmation for an NDL and may further allow a NAN device to skip some scheduled NDL time blocks without advanced notification (e.g., if the NAN device does not receive an indication of pending data from another peer NAN device). However, although such paging and trigger may be acceptable for medium/high latency, low traffic, and/or coarsely synchronized data exchanges, such a scheme may not be acceptable for low latency, high traffic, and/or well synchronized data exchanges due to paging and triggering overhead.

Therefore, in some embodiments, two (or more) NDL types may be defined. The first type (as described above) may be referred to as paged NDL (P-NDL). A second type (described in more detail below) may be referred to as synchronized (S-NDL). Hence, when multiple NAN devices establish an NDL, a negotiation may be performed to determine (or decide) an NDL type. In some embodiments, S-NDL may be a default (or mandatory) NDL type and P-NDL may be optional. For a S-NDL, each NAN device associate with the S_NDL may be present at the beginning of agreed (scheduled) NDL time blocks and may cancel remaining NDL time blocks of a current DW interval when there may be no more traffic pending. Each NAN device associated with the S-NDL may transmit data frames at a start of each scheduled NDL time block without using paging and triggering. In contrast, as described above, for a P-NDL, each NAN device may be present during a PW at a start of each scheduled NDL time block and may use paging and triggering before transmitting unicast data frames.

In some embodiments a NDL schedule may be a superset of a NAN data cluster (NDC) base schedule. The NDC base schedule may include at least one NDC time block, and may include two or more NDC time blocks. Note that for each NDL, an NDC time block may be included in one NDL time block. An NDL time block that includes an NDC time block may have a same start time as the NDC time block and an end of the NDL time block may be the same as or later than a corresponding NDC time block. In other words, the NDL time block and NDC time block may start at the same time, however, the NDL time block may have a duration equal to or greater than a duration of the NDC time block. In addition, a NAN device may transmit group addressed NAN management frames from a start of an NDC time block regardless of a corresponding NDL paging window.

In some embodiments, a multicast sink may establish/update an NDL with a multicast source by either accepting an NDL schedule proposal (can be used by both multicast and unicast transmissions) from a source or by negotiating with the source to create/update an NDL schedule. The multicast source may coordinate NDL schedules with all sinks to ensure sufficient common available slots for multicast transmissions. In some embodiments, an NDL between a multicast source and sink may always be a S-NDL. Thus, if two NAN devices establish a P-NDL prior to setup of a multicast session, the P-NDL may be changed (e.g., automatically) to a S-NDL upon establishment of the multicast session. Alternatively, an NDL between a multicast source and since my be optionally a S-NDL or a P-NDL. Thus, in some embodiments, the multicast source may multicast data from a start of any NDL time block regardless of the corresponding NDL paging window. However, in other embodiments, if there are one or more P-NDLs between the multicast source and sinks, the multicast source may transmit a pending multicast indication during a PW to keep P-NDL peers awake and then transmit multicast frames from the start of a subsequent DTW.

In some embodiments, all member NAN devices of a NDC may be present at one or more scheduled further availability (FA) time slots as indicated by a NDC base schedule, which may be determined by one of the members of the NDC (e.g., an NDC scheduler). However, in some embodiments, it may be difficult for one NDC member to determine an NDC base schedule suitable to all NDLs (e.g., S-NDLs and P-NDLs) within the NDC. Thus, in some embodiments, each NAN device within the NDL may select (or maintain) an NDC base schedule for an NDC. The NDC base schedule may be a superset, equal-set, or subset of any other active NAN peer's (with active NDLs) NDC base schedule within the NDC. Then, for each DW interval, all member NAN devices in the NDC may have a same (corresponding) start time for a first NDC time block. Note that if a member NAN device's NDC base schedule is a subset of an active NAN peer's NDC base schedule, then any further availability time slot that belongs to the NAN device's NDC base schedule may also belong to the active NAN peer's NDC base schedule. Additionally, if there is a further availability time slot that belongs to the peer's NDC base schedule, but does not belong to the NAN device's NDC base schedule, all time slots after this further availability slot (at least for the remaining DW interval) may not belong to the NAN device's NDC base schedule. Further, each NAN device may ensure that all its active NAN peers (with active NDLs) within the NDC are present in common (same) NDL time blocks as indicated by the NAN device's NDC base schedule.

In some embodiments, when two NAN devices establish an NDL, a NAN device with higher NDC scheduler rank may become an NDL scheduler for the NDL. During NDL scheduling negotiations, the NDL scheduler may propose its current NDC base schedule and its NDL schedule preferences and/or limitations to the NDL non-scheduler. In response, the NDL non-scheduler may determine to join the NDL scheduler's current NDC with an equal-set or subset of the NDL scheduler's current NDC base schedule (e.g., by removing zero or one or more further availability time slots from the end of the NDL scheduler's current NDC base schedule for each DW interval), or it may propose a new and/or different NDC base schedule (together with the NDC's base schedule) to the NDL scheduler, or it may reject the NDL setup with the NDL scheduler. In addition, if a NAN device advertises multiple NDCs for an NDL (e.g., multiple different NDC base schedules corresponding to multiple different NDCs), the NDL non-scheduler may choose one of the NDCs to join or suggest (propose) a new and/or different NDC to join.

In some embodiments, if the NDL non-scheduler determines to join the NDL scheduler's NDC with an equal-set or subset of the NDL scheduler's current NDC base schedule, and the NDL-Scheduler agrees on the new NDC base schedule proposal, then the NDL scheduler may update its own NDC base schedule to the newly negotiated NDC base schedule for the NDL. In addition, the NDL non-scheduler may update its own NDC base schedule to the newly negotiated NDC base schedule for the NDL unless its current NDC base schedule is a subset of the newly negotiated NDC base schedule. Note that the NAN devices may also negotiate an NDL schedule that may be either an equal-set or a superset of the newly negotiated NDC base schedule for the NDL. Note further that other NAN devices that have existing NDLs with the two NAN devices in the same NDC may not need to change their NDC base schedules. Additionally, in some embodiments, a NAN device may make use of its NDC base schedule by transmitting group addressed frames first (or giving higher priority to transmit group addressed frames) during its NDC time blocks.

Figure 6:
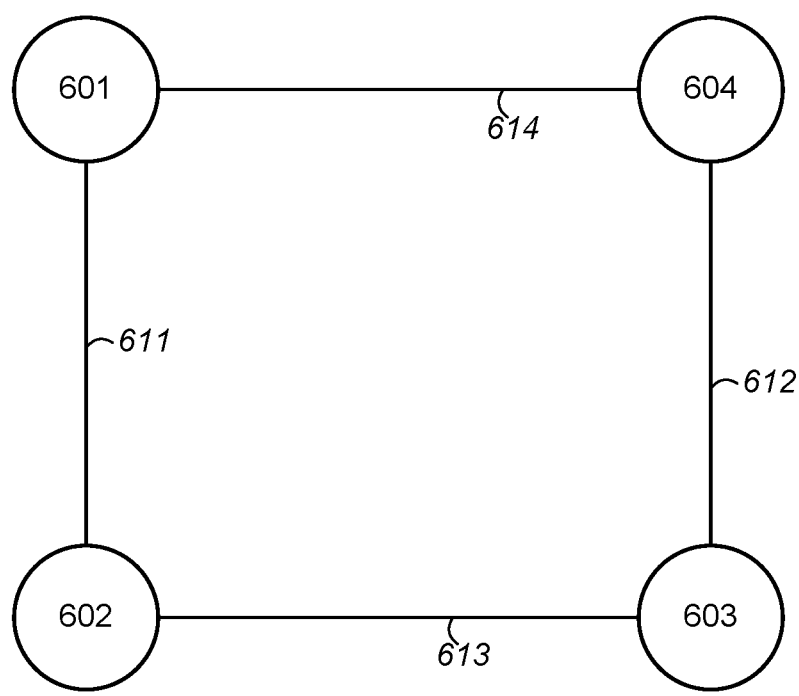
FIG. 6 illustrates an example negotiation of a flexible data cluster base schedule, according to some embodiments.

FIG. 6 illustrates an example negotiation of a flexible NDC base schedule according to some embodiments. NAN devices 601, 602, 603, and 604 may include features similar to features described above in reference to client station 106. As shown, the negotiation may proceed as follow.

At 611, NAN device 601 and NAN device 602 may establish (e.g., negotiate) a first NDL as well as a new NDC, e.g., NDC-x. Note that NAN device 601 and NAN device 602 may initially have a NDC base schedule that is common (same as) their NDL schedule.

At 612, NAN device 603 and NAN device 604 may establish (e.g., negotiate) a second NDL as well as another NDC, e.g., NDC-y. Similarly, NAN device 603 and NAN device 604 may initially have a NDC base schedule that is common (same as) their NDL schedule.

At 613, NAN device 602 and NAN device 603 may establish (e.g., negotiate) a third NDL with NAN device 602 assuming a role of NDL scheduler for the third NDL based on a higher NDC scheduler rank. Note that NAN device 602 and NAN device 603 may negotiate a NDC-x base schedule for the third NDL which may be a subset base schedule of NAN device 602's current NDC-x base schedule. In response, NAN device 602 may update its NDC-x base schedule to the subset schedule and NAN device 603 may create its NDC-x base schedule such that is common to (or the same as) NAN device 602's new NDC-x base schedule. Note that NAN device 602 and NAN device 603 may also negotiate an NDL schedule that may be a super set of their NDC-x base schedule.

Note further that NAN device 601 may continue to maintain its current NDC-x base schedule, which may be a superset of NAN device 602 and NAN device 603's NDC-x base schedule. Additionally, NAN device 603 may either keep the NDC-y with NA device 604 or propose to move the second NDL to NDC-x and if NAN device 604 agrees to move the second NDL to NDC-x, NAN device 603 and NAN device 604 may negotiate a new second NDL schedule and an NDC-x base schedule which may be a subset of NAN device 603's current NDC-x base schedule. NAN device 602 and NAN device 601 may not need to change their NDC-x base schedule.

At 614, NAN device 601 and NAN device 604 may establish (e.g., negotiate) a fourth NDL with NAN device 604 assuming a role of NDL scheduler for the fourth NDL based on a higher NDC scheduler rank. NAN device 601 and NAN device 604 may negotiate the fourth NDL schedule and an NDC-x base schedule which may be a subset of NAN device 604's current NDC-x base schedule (which is a subset of NAN device 603's current NDC-x base schedule which is a subset of NAN device 602's current NDC-x base schedule which was established with NAN device 601).

Figure 7A:
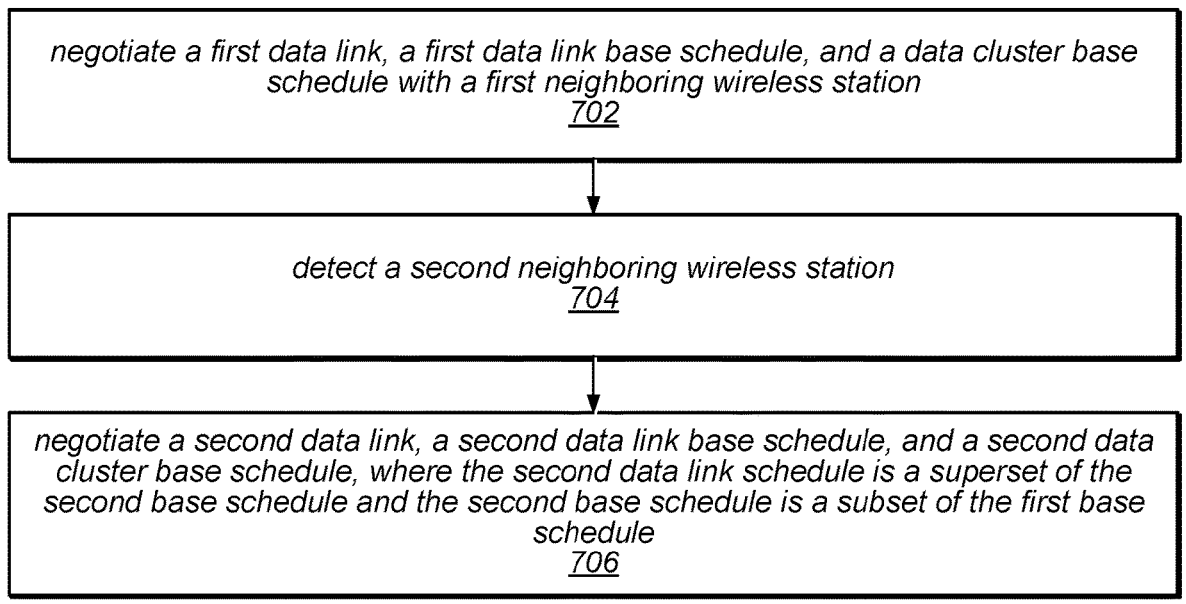
FIG. 7A illustrates a block diagram of an example of a method for negotiating a data link schedule and a data cluster schedule, according to some embodiments.

FIG. 7A illustrates a block diagram of an example of a method for negotiating a data link schedule and a data cluster schedule, according to some embodiments. The method shown in FIG. 7A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a wireless station may negotiate (e.g., exchange SDF frames), with a first neighboring wireless station, a first data link schedule (e.g., for a data link between the wireless station and the first neighboring wireless device) and a first base schedule for a data cluster. In some embodiments, the wireless station may transmit one or more SDFs that include first scheduling preferences of the wireless station. In addition, the wireless station may receive one or more SDFs that include second scheduling preferences of the first neighboring wireless station.

At 704, the wireless station may detect a second neighboring wireless device. The second neighboring wireless device may be publishing a service and/or attempting to subscribe to a service provided by the wireless station.

At 706, the wireless station may negotiate (e.g., exchange SDF frames), with a second neighboring wireless station, a second data link schedule (e.g., for a data link between the wireless station and the second neighboring wireless station) and a second base schedule for the data cluster. The second data link schedule may be a superset of the second base schedule and the second base schedule may be a subset of the first base schedule. In some embodiments, the wireless station may transmit one or more SDFs that include first scheduling preferences of the wireless station. In addition, the wireless station may receive one or more SDFs that include second scheduling preferences of the first neighboring wireless station.

In some embodiments, data link between the wireless station and either of the neighboring wireless stations may be one of a synchronized data link or a paging data link. In some embodiments, if the data link is a paging data link, a first time block may include a paging window at a start of the time block and a data transmission window subsequent to the paging window. In such embodiments, the wireless station may transmit a paging message to the neighboring wireless station prior to transmitting data in the data transmission window. In some embodiments, if the data link is a synchronized data link, the wireless station may transmit data at the start of the time block and may also receive data at the start of the time block.

Figure 7B:
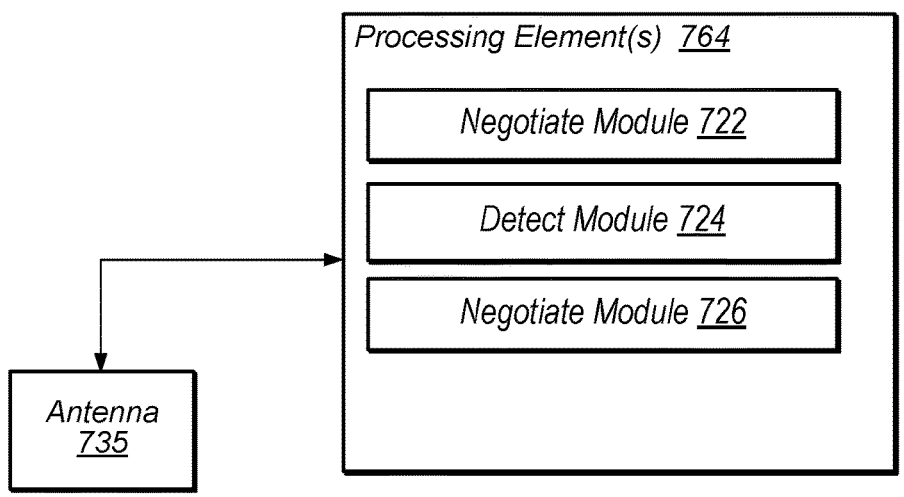
FIG. 7B illustrates an example of a processing element including modules for negotiating a data link schedule and a data cluster schedule, according to some embodiments.

FIG. 7B illustrates an example of a processing element including modules for . . . , according to some embodiments. In some embodiments, antenna 735 may be coupled (directly or indirectly) to processing element 764. The processing element may be configured to perform the method described above in reference to FIG. 7A. In some embodiments, processing element 735 may include one or more modules, such as modules (or circuitry) 722-726, and the modules (or circuitry) may be configured to perform various operations of the method described above in reference to FIG. 7A. In some embodiments, the processing element may be included in a wireless station, such as client station 106. As shown, the modules may be configured as follows.

In some embodiments, processing element 764 may include a negotiate module 722 configured to negotiate, with a first neighboring wireless station, a first data link schedule (e.g., for a data link with the first neighboring wireless device) and a first base schedule for a data cluster. In some embodiments, one or more SDFs that include first scheduling preferences may be transmitted. In addition, one or more SDFs that include second scheduling preferences of the first neighboring wireless station may be received.

In some embodiments, processing element 764 may include a detect module 724 configured detect a second neighboring wireless device. The second neighboring wireless device may be publishing a service and/or attempting to subscribe to a service provided by the wireless station.

In some embodiments, processing element 764 may include a negotiate module 726 configured to negotiate (e.g., exchange SDF frames), with a second neighboring wireless station, a second data link schedule (e.g., for a data link between with the second neighboring wireless station) and a second base schedule for the data cluster. The second data link schedule may be a superset of the second base schedule and the second base schedule may be a subset of the first base schedule. In some embodiments, one or more SDFs that include first scheduling preferences may be transmitted. In addition, the one or more SDFs that include second scheduling preferences of the first neighboring wireless station may be received.

In some embodiments, a data link with either of the neighboring wireless stations may be one of a synchronized data link or a paging data link. In some embodiments, if the data link is a paging data link, a first time block may include a paging window at a start of the time block and a data transmission window subsequent to the paging window. In such embodiments, a paging message may be transmitted to the neighboring wireless station prior to transmitting data in the data transmission window. In some embodiments, if the data link is a synchronized data link, data may be transmitted at the start of the time block and may also be received at the start of the time block.

It is apparent for those skilled in the art that, for the particular processes of the modules (or circuitry) described above (such as modules 722, 724, and 726), reference may be made to the corresponding operations (such as operations 702, 704, and 706, respectively) in the related process embodiment sharing the same concept and the reference is regarded as the disclosure of the related modules (or circuitry) as well. Furthermore, processing element 764 may be implemented in software, hardware or combination thereof. More specifically, processing element 764 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 764 may be implemented as a general-purpose processor such as a CPU, and therefore each module can be implemented with the CPU executing instructions stored in a memory which perform a respective operation.

Further Availability Attribute

In some embodiments, at least some of the schedule preferences and/or limitations as described above may be included in a further availability attribute (FAA). The FAA may include one or more of a further availability map attribute, one or more post-NAN-discovery attributes such as a WLAN infrastructure attribute, a P2P operation attribute, and a further NAN service discovery attribute. The FAA attribute may provide two dimensional channel/time further availability information and the post-NAN-discovery attributes may provide further availability information in time domain for individual interfaces. Note that for NAN 2.0 devices (i.e., for datapaths), the further NAN service discovery attribute may be extended as a pre-datapath operation (PDO) attribute, which may indicate the available slots for all PDOs (e.g., by using a NAN discovery interface).

In some embodiments, when a NAN device (device) receives a peer NAN device's FAA, the device may determine the peer device's further available time/channel/interface via comparison of a further availability map attribute to individual post-NAN discovery attributes. Note that a device may include more than one FAA to enable dual-band or multi-band simultaneous operations, with each FAA associated with a respective band. Additionally, in some embodiments, to support wider-bandwidth and MIMO operations, the post-NAN-discovery attributes may also include operating bandwidth and a number of MIMO spatial streams supported for individual available interfaces.

In some NAN scenarios, when a device receives a peer device's FAA, it may decide to transmit buffered frames to the peer device at the peer device's further availability slots as indicated by the peer device's FAA. However, the peer device may not transmit frames (other than control response frames) to the device unless the device has transmitted an FAA to the peer device to indicate it is available at the same time slot. For example, if the device broadcasts its FAA, it cannot ensure all peer devices receive the FAA correctly. Additionally, the device may want or need to limit announced further availability slots in order to remain more flexible to adjust its schedule (e.g., it may go to sleep if there is no more data to transmit or receive). Thus, in some embodiments, when a device transmits a frame (or buffered frames) to a peer device at the peer device's further availability time slot, the device may stay available until the end of the time slot (unless the time slot is cancelled through additional signaling between the devices). Additionally, when the device is present at one of the device's further availability time slots, the device may buffer frames to all peer devices that do not claim to be available at the time slot. Further, if the device receives a frame from an "unavailable" peer device, it may assume the peer device is available for the remainder of the time slot and may transmit buffered frames to the peer device until the end of the time slot. In some embodiments, the device may transmit an SDF (service discovery frame) to the peer device and may further request the peer device to resend its FAA (e.g., in case the device missed the peer device's most recent FAA).

In some NAN scenarios, there may be two types of FAAs: broadcast FAA and unicast FAA. When a device broadcasts an FAA (broadcast FAA) in a discovery window (DW), the device may be required to be present at all further availability time slots indicated by the broadcast FAA. Thus, a device may limit the available time slots in a broadcast FAA in order to be more flexible to adjust its schedule (e.g., the device may go to sleep if there is no more data to transmit and receive). Thus, in some embodiments, a device may determine to make a broadcast FAA different from one or more unicast (or multicast) FAAs. Further, the device may use different unicast (or multicast) FAAs for different peer devices (or multicast groups). For example, the device may use a broadcast FAA to indicate only required further availability time slots (e.g., only for absolutely needed operations).

In addition, the device may indicate additional further availability time slots in a unicast (or Multicast) FAA and may, in some embodiments, cancel those time slots later if the time slots become unnecessary. For example, the device may use a TX-END indication in a last transmitted frame (e.g., set a "more data" bit to 0 or set "EOSP" bit to 1) to inform a peer device (or a multicast group) that it will not transmit additional frames (i.e., the device may start to buffer frames instead of transmitting the frames) to the peer device (or multicast group) until the beginning of a next DW interval. Alternatively, or in addition, the peer device (or the multicast group members) may cancel the remaining unicast (or multicast) further available time slots for the device until the beginning of a next DW interval. As another example, the device may use an FA-cancel indication in a transmitted frame (e.g. set a "power management" bit to 1) to inform a peer device (or a multicast group) that it will not transmit or receive more frames from the peer device (i.e. requesting the peer device to buffer its frames) until the beginning of a next DW interval. Alternatively, or in addition, both the device and the peer device (or the multicast group members) may cancel the remaining unicast (or multicast) further available time slots for each other until the beginning of a next DW interval.

In some embodiments, a device may use a further availability (FA) extension indication in a transmitted frame to inform a peer device that it will be further available on a channel that the device is currently using immediately or almost immediately after a current time slot (i.e., in an extended time slot). Note that operating bandwidth and a number of supported MIMO spatial streams may remain the same as those the device is currently using. In addition, if the FA extension indication conflicts with a most recent FAA, it may overrule the most recent FAA. However, an FA extension indication may not conflict with a further availability time slot indicated by a most recent broadcast FAA. In some embodiments, the FA extension may only be valid for one additional time slot after a current time slot. Thus, for further extension, the device may transmit another frame with another FA extension indication in the extended time slot. In some embodiments, the FA extension indication may be valid until a next available time slot indicated by the most recent FAA or until the device cancels remaining available time slots, whichever comes earlier.

As described above, in some embodiments, when two or more devices want to establish a NAN unicast or multicast data link, a device with a higher or highest scheduler rank may become the scheduler for the data link and may decide and/or provide base schedules for the data link. The scheduler may specify (provide) two types of base schedules: a data cluster base schedule or a data link base schedule. A data cluster base schedule may be selected by a data cluster founder (i.e., a scheduler that starts the data cluster) and may schedule all NAN devices in the data cluster to be present at further availability time slots indicated by the data cluster base schedule. Additionally, at least some of the further availability time slots may be cancelled if they are no longer needed. Note that the data cluster base schedule may initially be selected by the data cluster founder but may be revised by new members with higher scheduler rank than the data cluster founder.

A data link base schedule may be a superset of a data cluster base schedule and a scheduler of the data link base schedule may mark a subset of its own further availability time slots (as indicated by the scheduler's broadcast and/or unicast and/or multicast FAAs) as a minimum required (or highly recommended) schedule for the data link. The peer device(s) of the data link may be present at the further availability time slots indicated by the data link base schedule. In some embodiments, some of the further availability time slots may be cancelled if they are no longer needed.

For example, FIGS. 8A and 8B illustrate example frame schedules for a scheduler (FIG. 8A) and a non-scheduler (FIG. 8B), according to some embodiments. As shown in FIG. 8A, a scheduler may select a first time slot following a 2.4 GHz discovery window (DW) as a data cluster base schedule. The first time slot may be a most convenient time for all devices in the data cluster to meet and communicate. In addition, the scheduler may mark all further availability time slots in a first half of its DW interval as the data link (DL) base schedule in order to limit (or avoid) frequent channel switches. In some embodiments, the scheduler may publish its broadcast further availability (FAA) which indicates when the scheduler is available. In some embodiments, a scheduler may also publish a unicast FAA which indicates when the scheduler is available for unicast transmissions. Note that the broadcast and unicast FAA schedules may not be followed (e.g., are cancelable) by a non-scheduler. Thus, as illustrated in FIG. 8B, a non-scheduler (e.g., a peer device) may follow both the data cluster base schedule and the DL base schedule of the scheduler but may overwrite the scheduler's further availability time slots beyond the data link base schedule.

As another example, FIGS. 9A-9B illustrate example frame schedules for a scheduler (FIG. 9A) and a non-scheduler (FIG. 9B) for support of low latency applications, according to some embodiments. As shown in FIG. 9A, a scheduler may define a data link base schedule that may support very low latency applications. The scheduler may be required to visit the infra channel (scheduler flexible-visiting) frequently, thus the scheduler may include the infra channel schedule in its broadcast FAA. As shown in FIG. 9B, a non-scheduler (e.g., a peer device) may follow both the data cluster base schedule and a data link base schedule but may overwrite the scheduler's infra channel schedule which may not be a part of the data link base schedule.

Figure 10A:
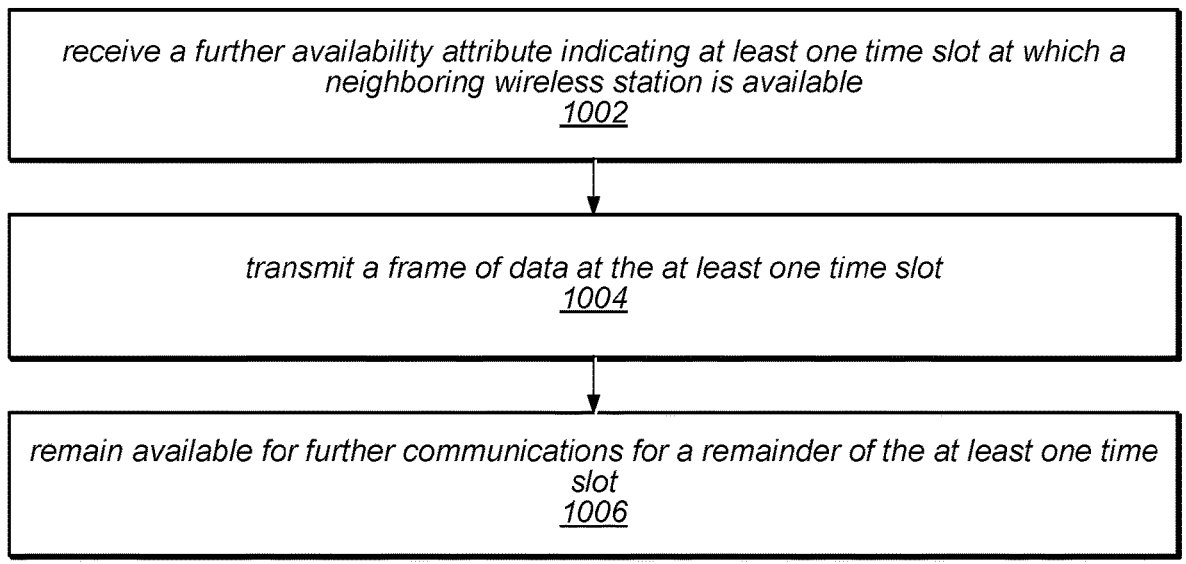
FIG. 10A illustrates a block diagram of an example of a method for advertising availability to peer devices, according to some embodiments.

FIG. 10A illustrates a block diagram of an example of a method for advertising availability to peer devices, according to some embodiments. The method shown in FIG. 10A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a wireless station may receive a further availability attribute (FAA) from a neighboring wireless station.

The FAA may indicate at least one time slot at which the neighboring wireless station is available. In some embodiments, the FAA may also indicate at least one channel on which the neighboring wireless device is available.

At 1004, the wireless station may transmit a frame of data at the at least one time slot to the neighboring wireless device.

At 1006, the wireless station may remain available for further communications for a remainder of the at least one time slot.

In some embodiments, the wireless station may buffer frames to neighboring wireless stations that are not available at the at least one time slot. In some embodiments, the wireless station may receive at least one frame during the at least one time slot from another neighboring wireless station that has not indicated availability during the at least one time slot and may transmit previously buffered frames to other neighboring wireless station for a remainder of the at least one time slot.

Figure 10B:
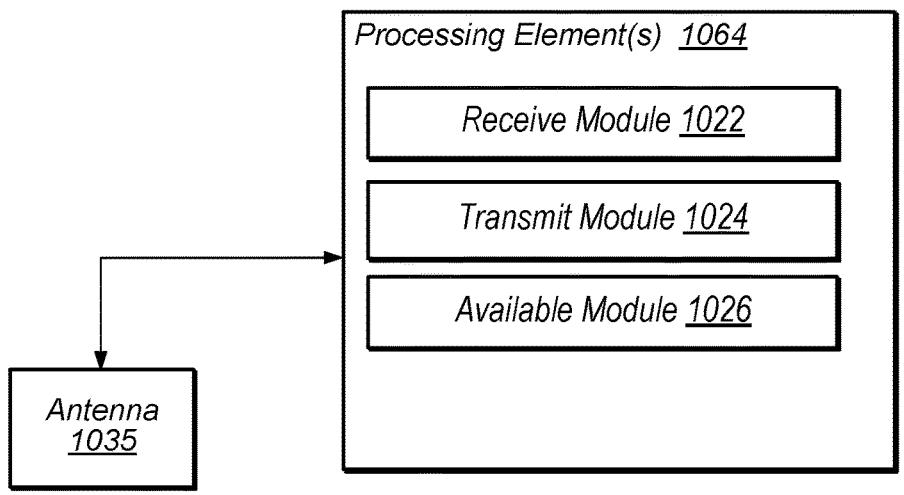
FIG. 10B illustrates an example of a processing element including modules for advertising availability to peer devices, according to some embodiments.

In some embodiments, the wireless station may transmit a broadcast further availability attribute (FAA) to a plurality of neighboring wireless stations. The broadcast FAA may indicate all times slots available for communication. In addition, the time slots indicated in the broadcast FAA may include a minimum number of required time slots. In some embodiments, the wireless station may transmit a unicast FAA to the neighboring wireless station and the unicast FAA may indicate different time slots than the broadcast FAA FIG. 10B illustrates an example of a processing element including modules for advertising availability to peer devices, according to some embodiments. In some embodiments, antenna 1035 may be coupled (directly or indirectly) to processing element 1064. The processing element may be configured to perform the method described above in reference to FIG. 10A. In some embodiments, processing element 1035 may include one or more modules, such as modules (or circuitry) 1022-1026, and the modules (or circuitry) may be configured to perform various operations of the method described above in reference to FIG. 10A. In some embodiments, the processing element may be included in a wireless station, such as client station 106. As shown, the modules may be configured as follows.

In some embodiments, processing element 1064 may include a receive module 1022 configured to receive a further availability attribute (FAA) from a neighboring wireless station. The FAA may indicate at least one time slot at which the neighboring wireless station is available. In some embodiments, the FAA may also indicate at least one channel on which the neighboring wireless device is available.

In some embodiments, processing element 1064 may include a transmit module 1024 configured to transmit a frame of data at the at least one time slot to the neighboring wireless device.

In some embodiments, processing element 1064 may include an available module 1026 configured to remain available for further communications for a remainder of the at least one time slot.

In some embodiments, the processing element may generate instructions to buffer frames to neighboring wireless stations that are not available at the at least one time slot. In some embodiments, the processing element may receive at least one frame during the at least one time slot from another neighboring wireless station that has not indicated availability during the at least one time slot and may generate instructions to transmit previously buffered frames to other neighboring wireless station for a remainder of the at least one time slot.

In some embodiments, the processing element may generate instructions to transmit a broadcast further availability attribute (FAA) to a plurality of neighboring wireless stations. The broadcast FAA may indicate all times slots available for communication. In addition, the time slots indicated in the broadcast FAA may include a minimum number of required time slots. In some embodiments, the processing element may generate instructions to transmit a unicast FAA to the neighboring wireless station and the unicast FAA may indicate different time slots than the broadcast FAA.

It is apparent for those skilled in the art that, for the particular processes of the modules (or circuitry) described above (such as modules 1022, 1024, and 1026) reference may be made to the corresponding operations (such as operations 1022, 1024, and 1026, respectively) in the related process embodiment sharing the same concept and the reference is regarded as the disclosure of the related modules (or circuitry) as well. Furthermore, processing element 1064 may be implemented in software, hardware or combination thereof. More specifically, processing element 1064 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1064 may be implemented as a general-purpose processor such as a CPU, and therefore each module can be implemented with the CPU executing instructions stored in a memory which perform a respective operation.

NAN Pre-Datapath Scheduling

In some embodiments, pre-datapath scheduling may be necessary when at least two NAN devices intend to conduct pre-datapath operations (PDOs), such as ranging, further service discovery, and/or datapath setup, outside of discovery windows (DWs). For example, after a subscriber receives a publish service discovery frame (SDF) from a publisher (either solicited or unsolicited), the subscriber may trigger PDOs with the publisher via a PDO trigger SDF. The PDO trigger SDF may be a follow-up (request) SDF for further service discovery, a connect session request SDF for datapath setup, a ranging request SDF, and/or a generic advertisement service (GAS) scheduling SDF for GAS-based further service discovery.

In some embodiments, a publisher may or may not include a further availability attribute (FAA) in its publish SDF. Thus, if a subscriber decides to trigger PDO with a publisher and wants to conduct PDO outside of DWs, the subscriber may transmit a PDO trigger SDF to the publisher and include an FAA in the PDO trigger SDF. In response to receiving the PDO trigger SDF from the subscriber, the publisher may transmit a PDO response SDF to the subscriber and include an FAA in the PDO response SDF if the publisher did not include any FAA in its publish SDF. Alternatively, if the publisher did include an FAA in its publish SDF, the publisher may transmit a PDO response SDF to the subscriber to convey an updated FAA to the subscriber. Note that the PDO response SDF may be a follow-up (response) SDF for further service discovery, a connect session response SDF for datapath setup, a ranging response SDF, and/or a GAS scheduling SDF for GAS-based further service discovery. Once the publisher and subscriber obtain each other's FAAs, they may be present at each other's further availability time slots and may transmit frames to each other during the time slots.

As described above, a publisher may include an FAA in its publish SDF for currently active pre-datapath and datapath operations. In some embodiments, if the publisher supports 2.4 GHz only subscribers, the publisher may ensure that a 2.4 GHz only subscriber will have at least one common available time slot with the publisher for pre-datapath operations by either indicating, and being present at, a first 16-TU time slot following a 2.4 GHz DW on a 2.4 GHz NAN channel or indicating, and being present at, a first 16-TU time slot immediately following the 2.4 GHz DW on any 2.4 GHz channel. In other words, to ensure that a subscriber will have at least one common available time slot with the publisher for PDOs, the publisher may indicate, and be present at, a 16 U time slot immediately following a 2.4 GHz DW on the 2.4 GHz NAN channel or any 2.4 GHz channel.

In addition, a subscriber that intends to trigger PDOs with a publisher may create and/or update its FAA with sufficient common available time slots with the publisher and may transmit its FAA to the publisher during one of the publisher's available time slots (including DW). Note that if the subscriber is a 2.4 GHz only device and the publisher does not provide any 2.4 GHz further availability slots in its FAA, the subscriber may transmit its FAA to the publisher with suggested further availability slots. Thus, the subscriber may indicate, and be present during, a first 16-TU time slot following a subsequent 2.4 GHz DW on the 2.4 GHz NAN channel. Further, upon receiving the subscriber's FAA, the publisher may be present during the first 16-TU time slot following the subsequent 2.4 GHz DW on the 2.4 GHz NAN channel. In some embodiments, if a publisher includes an FAA in its publish SDF and a subscriber cannot operate on any of the channels associated with the publisher's further availability time slots, the subscriber that intends to conduct PDO with the publisher outside of DWs may include an FAA in the PDO trigger SDF to indicate that the subscriber may be available in a first 16-TU time slot on the 2.4 GHz NAN channel following the 2.4 GHz DW. Further, when the publisher receives the PDO trigger SDF, it may also be present at the first 16-TU time slot on the 2.4 GHz NAN channel.

In some embodiments, the publisher may update its FAA by taking into account the subscriber's FAA and may transmit an updated FAA to the subscriber at one of the subscriber's available time slots (including a discovery window). Note that in some embodiments, if a device broadcasts an FAA in a discover window (DW), the device may not convert its "available slots" to "unavailable slots" until it sends an update (e.g., an updated FAA) during a DW. An updated FAA may include time slots that were converted from "unavailable slots" to "available slots" before the next DW (e.g., in order to have more common available time slots with a subscriber and/or publisher). Note further that if a device sends a unicast SDF carrying an FAA to a peer device, the device may update the FAA at any future time by converting either "available slots" to "unavailable slots" or "unavailable slots" to "available slots" and sending a unicast SDF carrying an updated FAA to the peer device.

In some embodiments, a publisher may choose and/or indicate that it does not support 2.4 GHz only subscribers. In such embodiments, the publisher may not need to include any 2.4 GHz further availability time slots in its FAA. The publisher, since it does not support 2.4 GHz only subscribers, may choose to skip the 2.4 GHz DW and/or stay at a 5 GHz NAN channel during 2.4 GHz DWs.

As described above, a publisher may not include an FAA in its publish SDF if the publisher does not have any existing pre-datapath and datapath operations. However, the publisher may include its FAA limitations, such as band and/or channel limitations in its publish SDF. Additionally, the publisher may include its further availability (FA) preference in its publish SDF. The FA preference may include a pre-defined FA schedule, a preferred FAA, and/or a preferred band and/or channel list. In some embodiments, a subscriber that intends to trigger PDOs with the publisher may create and/or update the subscriber's FAA based on the publisher's preferences and/or limitations (as indicated in the publish SDF). The subscriber may transmit its FAA to the publisher at a DW and may explicitly request that the publisher be further available by including an FAA in the subscriber's responding SDF. Hence, the publisher may create and/or update its FAA based on the subscriber's FAA and may transmit an updated (or new) FAA to the subscriber at one of the subscriber's available time slots (including DW) as indicated by the subscriber's FAA.

In some embodiments when a subscriber uses active subscription, the subscriber may trigger pre-datapath scheduling by transmitting a unicast subscribe/follow-up SDF and/or by transmitting a multicast subscribe SDF with a list of (MAC addresses of) desired respondents. The subscriber may or may not include an FAA in its subscribe/follow-up SDF. Note that if the subscriber supports 2.4 GHz only publishers and the subscriber includes an FAA in its subscribe/follow-up SDF, the subscriber may indicate, and be present at, a first 16-TU time slot following the 2.4 GHz DW on the 2.4 GHz NAN channel. In addition, if the subscriber does not include an FAA, it may indicate its FAA limitations and may include its FAA preference in the subscribe/follow-up SDF.

In some embodiments, the subscriber may also include an explicit indication to request targeted respondent(s) (e.g., publisher(s)) to provide an FAA for PDOs and the targeted respondent(s) may include an FAA in subsequent publish/follow-up SDFs. The FAA may be based on the subscriber's FAA if available. Further, the subscriber may update its FAA based on a publisher's FAA and may transmit an updated FAA to the publisher at further available time slots (as indicated by the publisher's FAA, including DW) of the publisher.

Figure 11A:
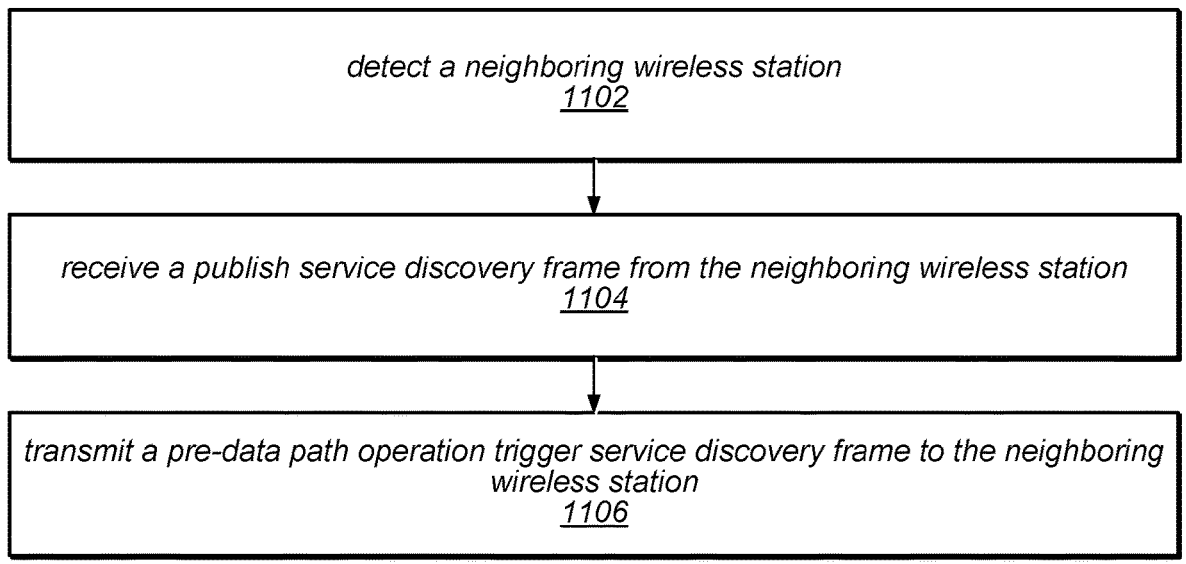
FIG. 11A illustrates a block diagram of an example of a method for triggering pre-datapath operations, according to some embodiments.

FIG. 11A illustrates a block diagram of an example of a method for triggering a pre-datapath operation, according to some embodiments. The method shown in FIG. 11A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a neighboring wireless station may be detected. The neighboring wireless station may be advertising a service (e.g., publishing a service) via Wi-Fi signaling.

At 1104, a publish service discovery frame (SDF) may be received from the neighboring wireless station. In some embodiments, the publish SDF may include a further availability attribute (FAA) as described above. In other embodiments, the FAA may not be included in the publish SDF.

At 1106, a pre-data operation (PDO) trigger SDF may be transmitted to the neighboring wireless station. The PDO trigger SDF may trigger setup of at least one PDO with the neighboring wireless device. In some embodiments, the PDO trigger SDF may include at least one of a follow-up SDF, a connect session request SDF for datapath setup, a ranging request SDF, and/or a generic advertisement (GAS) scheduling SDF for GAS-based further service discovery.

Figure 11B:
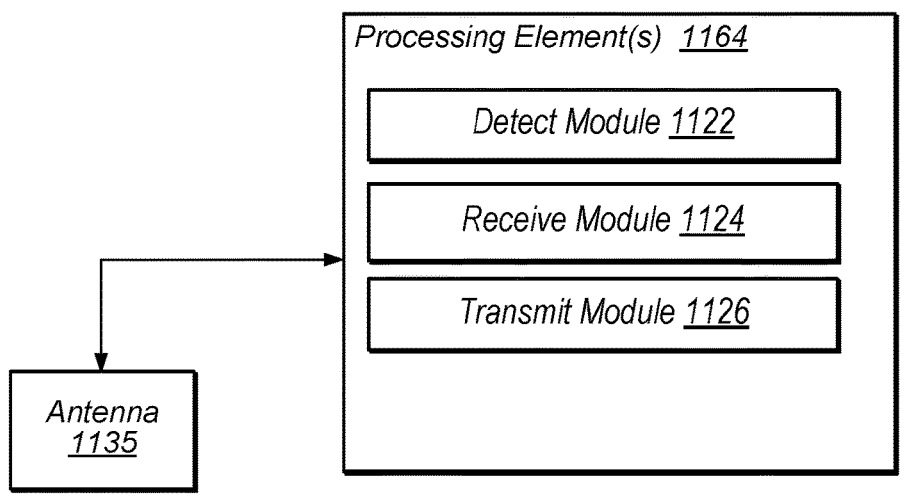
FIG. 11B illustrates an example of a processing element including modules for triggering per-datapath operations, according to some embodiments.

FIG. 11B illustrates an example of a processing element including modules for triggering a pre-datapath operation, according to some embodiments. In some embodiments, antenna 1135 may be coupled (directly or indirectly) to processing element 1164. The processing element may be configured to perform the method described above in reference to FIG. 11A. In some embodiments, processing element 1164 may include one or more modules, such as modules (or circuitry) 1122-1126, and the modules (or circuitry) may be configured to perform various operations of the method described above in reference to FIG. 11A. In some embodiments, the processing element may be included in a wireless station, such as client station 106. As shown, the modules may be configured as follows.

In some embodiments, processing element 1164 may include a detect module 1122 configured to detect a neighboring wireless station. The neighboring wireless station may be advertising a service (e.g., publishing a service) via Wi-Fi signaling.

In some embodiments, processing element 1164 may include a receive module 1124 configured to receive a publish service discovery frame (SDF) from the neighboring wireless station. In some embodiments, the publish SDF may include a further availability attribute (FAA) as described above. In other embodiments, the FAA may not be included in the publish SDF.

In some embodiments, processing element 1164 may include a transmit module 1126 configured to generate instructions to transmit a pre-data operation (PDO) trigger SDF to the neighboring wireless station. The PDO trigger SDF may trigger setup of at least one PDO with the neighboring wireless device. In some embodiments, the PDO trigger SDF may include at least one of a follow-up SDF, a connect session request SDF for datapath setup, a ranging request SDF, and/or a generic advertisement (GAS) scheduling SDF for GAS-based further service discovery.

It is apparent for those skilled in the art that, for the particular processes of the modules (or circuitry) described above (such as modules 1122, 1124, and 1126), reference may be made to the corresponding operations (such as operations 1102, 1104, and 1106, respectively) in the related process embodiment sharing the same concept and the reference is regarded as the disclosure of the related modules (or circuitry) as well. Furthermore, processing element 1164 may be implemented in software, hardware or combination thereof. More specifically, processing element 1164 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1164 may be implemented as a general-purpose processor such as a CPU, and therefore each module can be implemented with the CPU executing instructions stored in a memory which perform a respective operation.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
at least one radio in communication with the at least one antenna and configured to perform Wi-Fi communications; and
at least one processor in communication with to the at least one radio, wherein the wireless station is configured:
determine a first scheduler rank attribute of the wireless station, wherein the first scheduler rank attribute is based at least in part on a number data links and types of data links associated with the wireless station;
advertise the first scheduler rank attribute as an advertised rank;
receive, from a neighboring wireless station, a second scheduler rank attribute, wherein the second scheduler rank attribute is based at least in part on a number of data links and types of data links associated with the neighboring wireless station, and wherein the wireless station and the neighboring wireless station are associated with a data cluster;
in response to determining that the second scheduler rank attribute is greater than the first scheduler rank attribute, update the advertised rank to the second scheduler rank attribute and mark the neighboring wireless station as a parent peer device; and
advertise the second scheduler rank attribute as the advertised rank of the wireless station.

2. The wireless station of claim 1,
wherein the wireless station is further configured to:
receive a base schedule for a data link from the neighboring wireless station.

3. The wireless station of claim 2,
wherein the wireless station is further configured to:
update the first scheduler rank attribute based on the data link established with the neighboring wireless station.

4. The wireless station of claim 1,
wherein in response to determining that the second scheduler rank attribute is less than the first scheduler rank attribute, the wireless station is configured to:
determine that the wireless station is a scheduler for a data link to be scheduled with the neighboring wireless station.

5. The wireless station of claim 4,
wherein the wireless station is further configured to:
determine a base schedule for the data link with the neighboring wireless station; and
transmit the base schedule for the data link to the neighboring wireless station.

6. The wireless station of claim 1,
wherein the wireless station and the neighboring wireless station are comprised in a neighbor awareness networking (NAN) data cluster.

7. The wireless station of claim 1,
wherein the wireless station and the neighboring wireless station are comprised in a neighbor awareness networking (NAN) data cluster.

8. The wireless station of claim 1,
wherein the first scheduler rank attribute is further based at least in part on respective quality of service (QoS) requirements of data links associated with the wireless station.

9. An apparatus, comprising:
a memory; and
a processing element in communication with the memory, wherein the processing element is configured to:
determine a first scheduler rank attribute of a wireless station, wherein the first scheduler rank attribute is based at least in part on a number data links and respective quality of service (QoS) requirements of data links associated with the wireless station;
advertise the first scheduler rank attribute as an advertised rank;
establish a data link with a neighboring wireless station;
update the first scheduler rank attribute based on the data link established with the neighboring wireless station;
in response to determining that the neighboring wireless station has a scheduler rank attribute that is greater than the first scheduler rank attribute, mark the neighboring wireless station as a parent peer device; and
advertise the updated first scheduler rank attribute as the advertised rank.

10. The apparatus of claim 9,
wherein the processing element is further configured to:
receive a base schedule for the data link from the neighboring wireless station.

11. The apparatus of claim 9,
wherein, in response to determining that the neighboring wireless station has a scheduler rank attribute that is less than the first scheduler rank attribute, the processing element is further configured to:
determine that the apparatus is a scheduler for the data link established with the neighboring wireless station.

12. The apparatus of claim 11,
wherein the processing element is further configured to:
determine a base schedule for the data link with the neighboring wireless station; and
generate instructions to transmit the base schedule for the data link to the neighboring wireless station.

13. The apparatus of claim 9,
wherein the apparatus and the neighboring wireless station are comprised in a neighbor awareness networking (NAN) data cluster.

14. The apparatus of claim 9,
wherein the first scheduler rank attribute is further based at least in part on types of data links associated with the wireless station.

15. A non-transitory computer readable memory medium storing program instructions executable by processor circuitry of a wireless station to:
determine a first scheduler rank attribute of the wireless station, wherein the first scheduler rank attribute is based at least in part on a number data links and types of data links associated with the wireless station, wherein the types of data links include voice, video, unicast, multicast, or background;
advertise the first scheduler rank attribute as an advertised rank;
receive, from a neighboring wireless station, a second scheduler rank attribute, wherein the second scheduler rank attribute is based at least in part on a number of data links and types of data links associated with the neighboring wireless station;
in response to determining that the second scheduler rank attribute in greater than the first scheduler rank attribute, update the advertised rank to the second scheduler rank attribute and mark the neighboring wireless station as a parent peer device; and
advertise the second scheduler rank attribute as the advertised rank of the wireless station.

16. The non-transitory computer readable memory medium of claim 15,
wherein the program instructions are further executable to:
receive a base schedule for a data link from the neighboring wireless station.

17. The non-transitory computer readable memory medium of claim 16,
wherein the program instructions are further executable to:
update the first scheduler rank attribute based on the data link established with the neighboring wireless station.

18. The non-transitory computer readable memory medium of claim 15,
wherein, in response to determining that the second scheduler rank attribute is less than the first scheduler rank attribute, the program instructions are further executable to:
determine that the wireless station is a scheduler for a data link to be scheduled with the neighboring wireless station.

19. The non-transitory computer readable memory medium of claim 18,
wherein the program instructions are further executable to
determine a base schedule for the data link with the neighboring wireless station; and
generate instructions to transmit the base schedule for the data link to the neighboring wireless station.

20. The non-transitory computer readable memory medium of claim 15,
wherein the wireless station and the neighboring wireless station are comprised in a neighbor awareness networking (NAN) data cluster.

* * * * *